United States Patent
Hashizume et al.

(10) Patent No.: US 6,394,607 B1
(45) Date of Patent: *May 28, 2002

(54) POLARIZED LIGHT SEPARATION DEVICE, METHOD OF FABRICATING THE SAME AND PROJECTION DISPLAY APPARATUS USING THE POLARIZED LIGHT SEPARATION DEVICE

(75) Inventors: Toshiaki Hashizume; Yoshitaka Itoh; Akitaka Yajima, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,803

(22) PCT Filed: Mar. 12, 1997

(86) PCT No.: PCT/JP97/00790

§ 371 (c)(1),
(2), (4) Date: Nov. 12, 1997

(87) PCT Pub. No.: WO97/34173

PCT Pub. Date: Sep. 18, 1997

(30) Foreign Application Priority Data

Mar. 12, 1996 (JP) ............................................. 8-055215
Oct. 25, 1996 (JP) ............................................. 8-301138

(51) Int. Cl.$^7$ ............................................. G03B 21/00
(52) U.S. Cl. ........................................... 353/31; 353/20
(58) Field of Search .................... 353/20, 31; 349/9, 349/115; 359/487, 500

(56) References Cited

U.S. PATENT DOCUMENTS

| | | |
|---|---|---|
| 2,748,659 A | 6/1956 | Geffcken et al. |
| 5,096,520 A | 3/1992 | Faris |
| 5,221,982 A | 6/1993 | Faris |
| 5,278,680 A * | 1/1994 | Karasawa et al. ............ 359/40 |
| 5,357,370 A * | 10/1994 | Miyatake et al. ............ 359/495 |
| 5,486,884 A * | 1/1996 | De Vaan ..................... 353/122 |
| 5,555,186 A | 9/1996 | Shioya |
| 5,703,710 A * | 12/1997 | Brinkman et al. ........... 359/283 |
| 5,777,975 A * | 7/1998 | Horinouchi et al. ......... 369/112 |
| 5,805,563 A * | 9/1998 | Nakano .................... 369/275.1 |

FOREIGN PATENT DOCUMENTS

| | | |
|---|---|---|
| DE | 935 663 | 1/1956 |
| GB | 2 153 546 | 8/1985 |
| JP | 7-43508 | 2/1995 |
| JP | 7-225379 | 8/1995 |
| JP | 7-294906 | 11/1995 |

OTHER PUBLICATIONS

Patent Abstracts of Japan, vol. 008, No. 042 (p–256), Feb. 23, 1984, JP 58 194004, Nov. 11, 1983.

* cited by examiner

Primary Examiner—Safet Metjahic
Assistant Examiner—E P LeRoux
(74) Attorney, Agent, or Firm—Oblon, Spivak, McClelland, Maier & Neustadt, P.C.

(57) ABSTRACT

The invention provides a plate-shaped polarized light separation device that has a repetitive structure of polarized light separation film surfaces and reflective film surfaces arranged alternately at a fine pitch, along with a projection display apparatus that uses this polarized light separation device. In the process of manufacturing the polarized light separation device, first a glass block is formed by alternately pasting together plate glass with a polarized light separation film made up of a multi-layer thin film of inorganic material upon its surface and plate glass with a reflecting film upon its surface, and this glass block is cut obliquely to the pasted surfaces. A projection that is usable at the time of the positioning of the polarization beam splitter may be provided on at least one side of this plate-shaped block that is thus cut out. By providing a λ/2 phase plate on portions of the light exit surface of this polarized light separation device, one obtains a polarized light separation device that takes light from a light source and emits it as a light flux having only one direction of polarization, either S-polarized light or P-polarized light. Such a polarized light separation device can be used in a projection display apparatus.

36 Claims, 24 Drawing Sheets

Fig. 8 (A) CUTTING OF BOTH ENDS
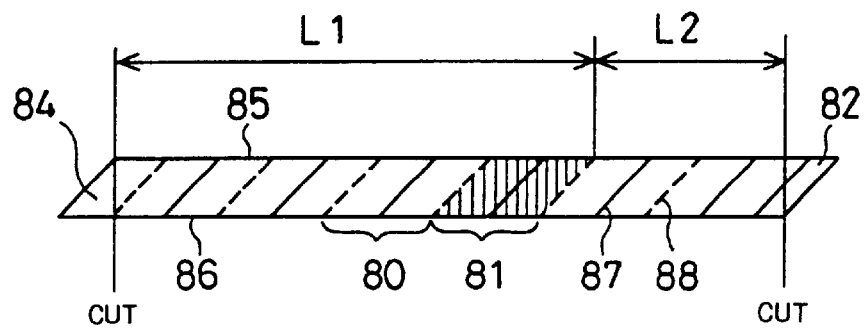
Fig. 8 (B) ATTACHING THE SELECTIVE PHASE-DIFFERENCE PLATE 380
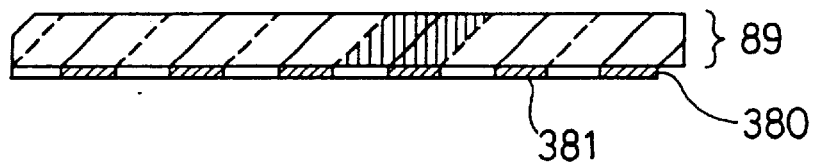
Fig. 8 (C) PASTING TO FOCUSING LENS ARRAY 310
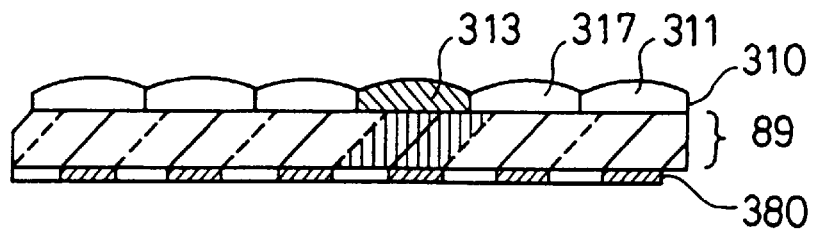

Fig. 12 (A)  CUTTING OF BOTH ENDS
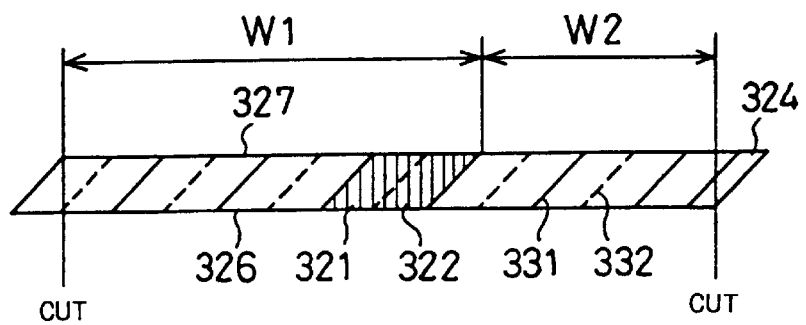
Fig. 12 (B)  ATTACHING THE SELECTIVE PHASE-DIFFERENCE PLATE 380
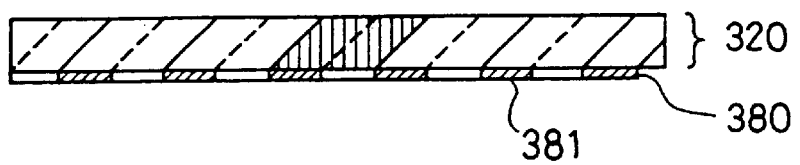
Fig. 12 (C)  PASTING TO FOCUSING LENS ARRAY 310
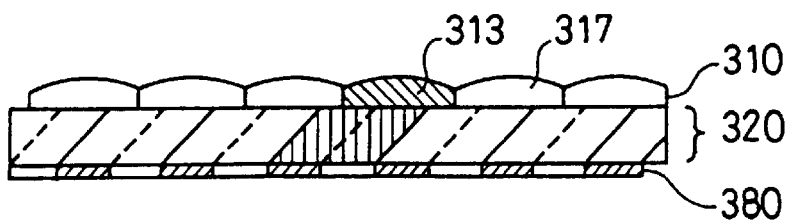

CASE WHEN SELECTIVE PHASE-DIFFERENCE PLATE 380 IS IN THE CORRECT POSITION

CASE WHEN SELECTIVE PHASE-DIFFERENCE PLATE 380 IS OFFSET (WITH DUMMY)

SAME AS LEFT (WITHOUT DUMMY)

Fig. 18 (A) POLARIZATION BEAM SPLITTER ALONE
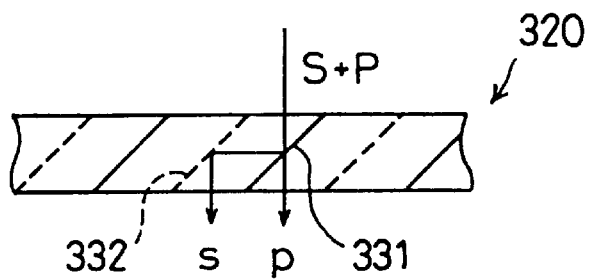
Fig. 18 (B) POLARIZED LIGHT CONVERSION ELEMENT (FRONT AND BACK ARE CORRECT)
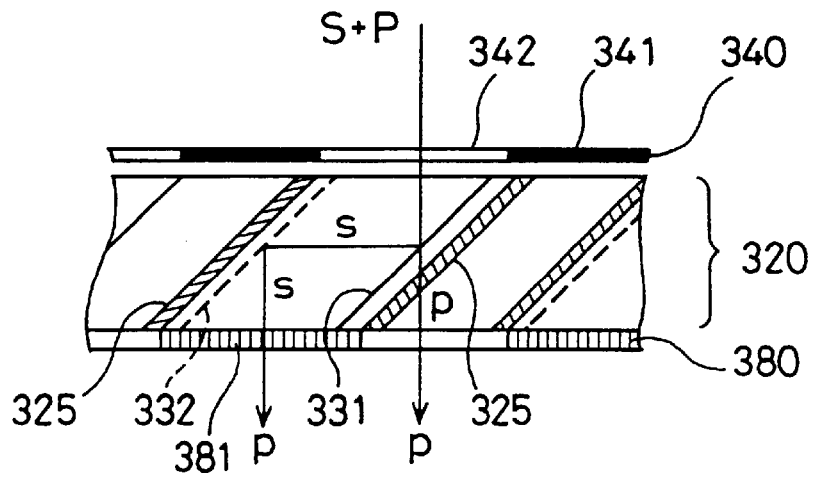
Fig. 18 (C) POLARIZED LIGHT CONVERSION ELEMENT (FRONT AND BACK ARE REVERSED)
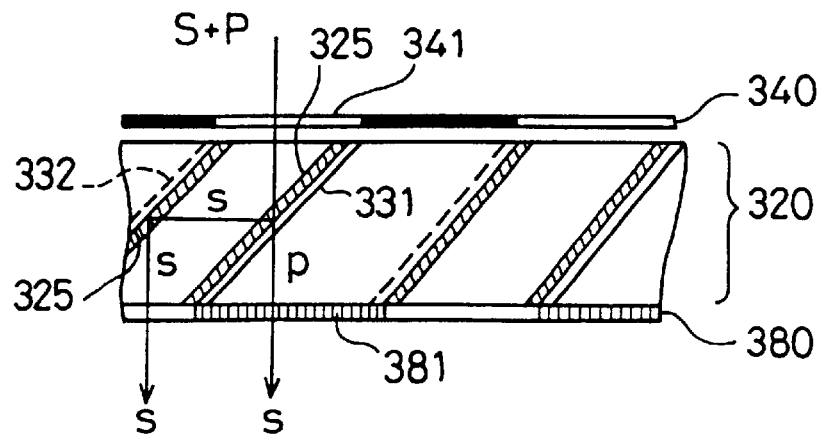

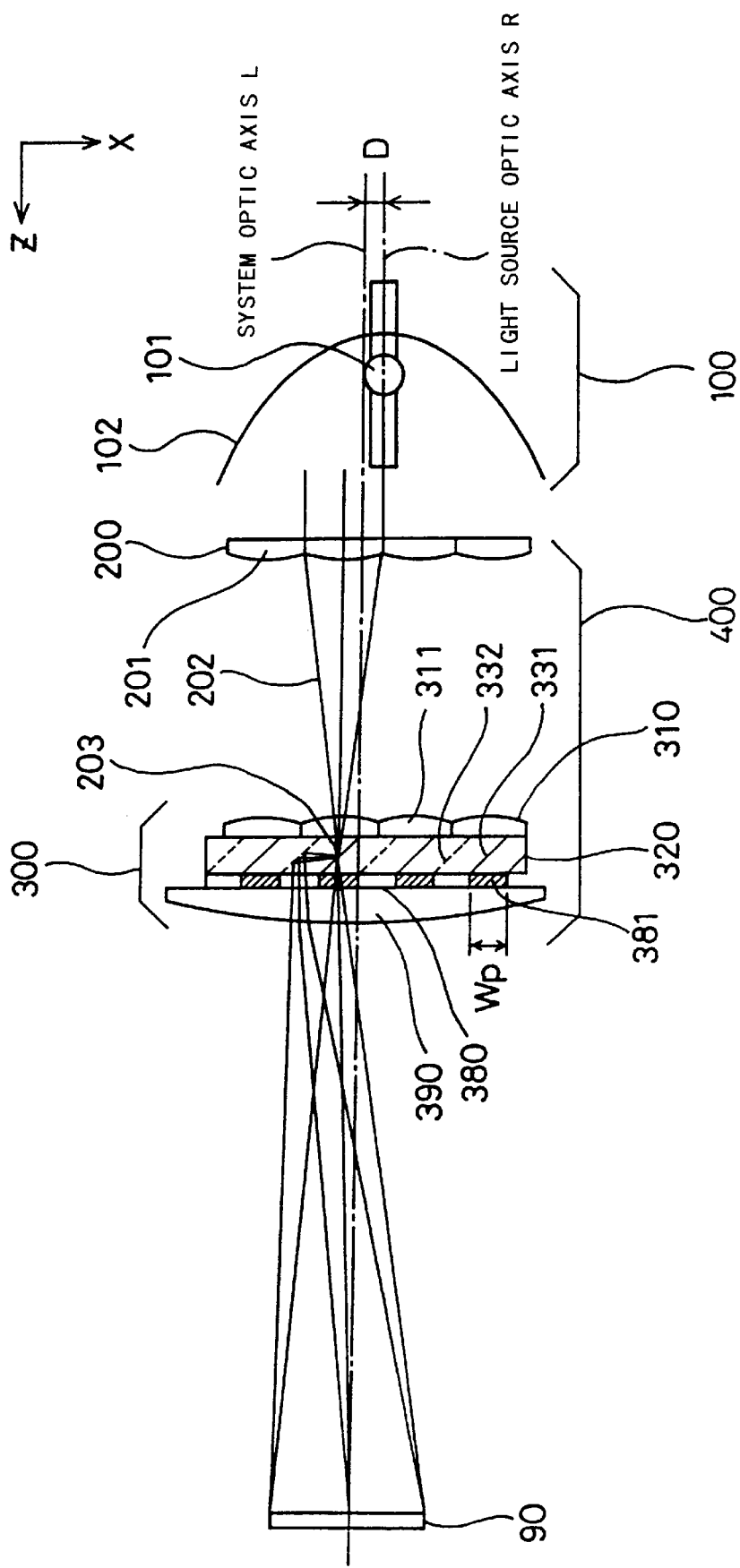
Fig. 19 POLARIZED LIGHT ILLUMINATION APPARATUS 500

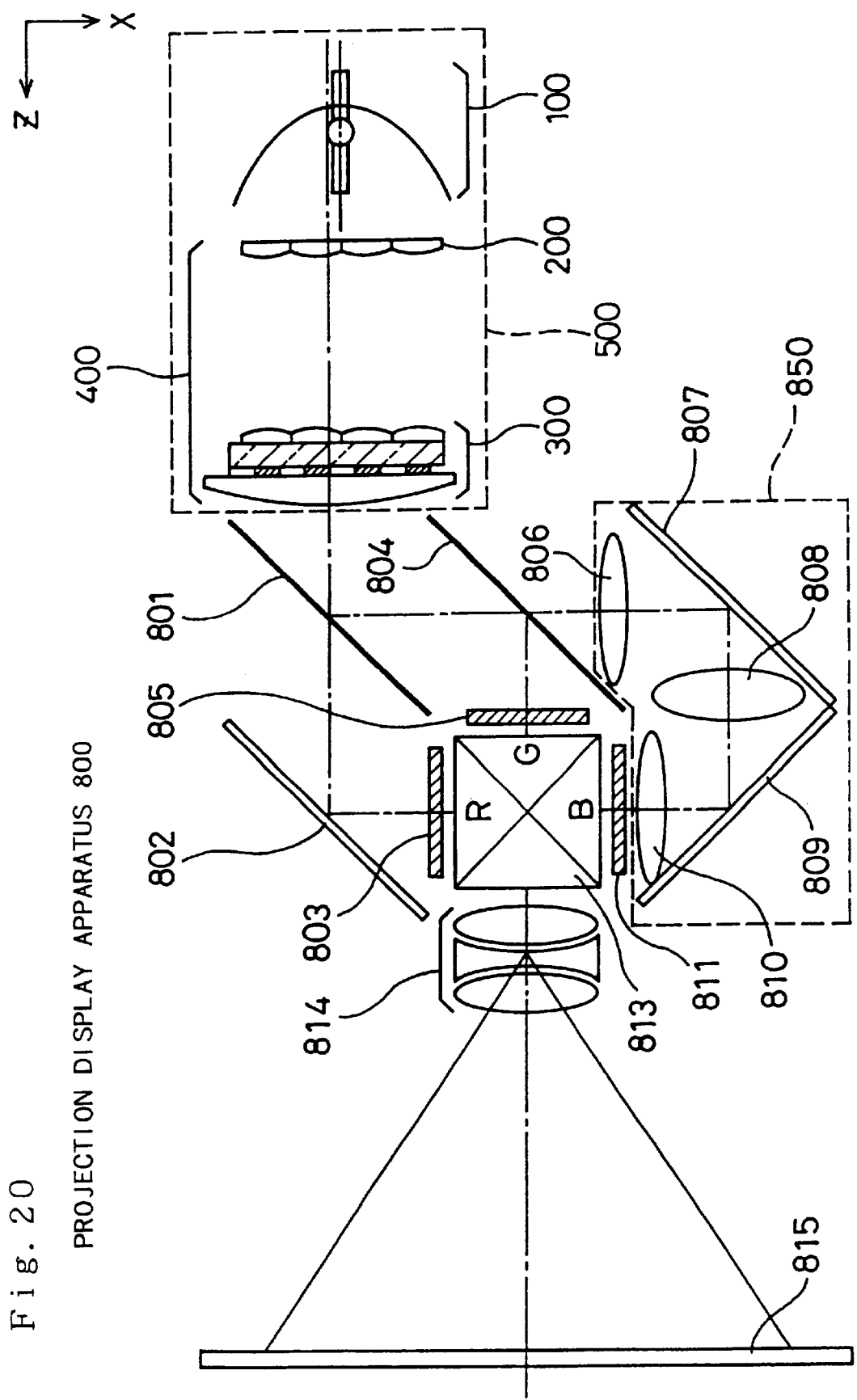
Fig. 20 PROJECTION DISPLAY APPARATUS 800

Fig. 23
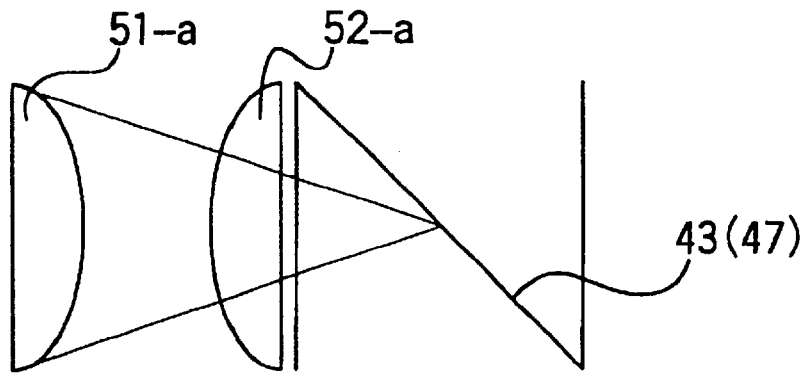
51-a  52-a
43(47)
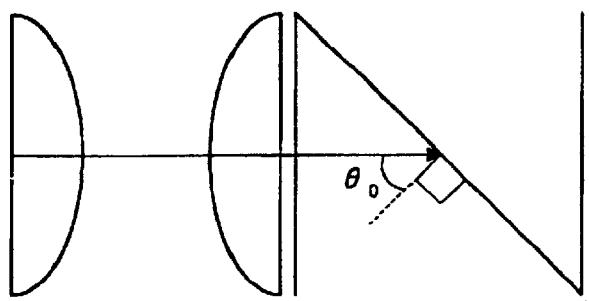
$\theta_0$
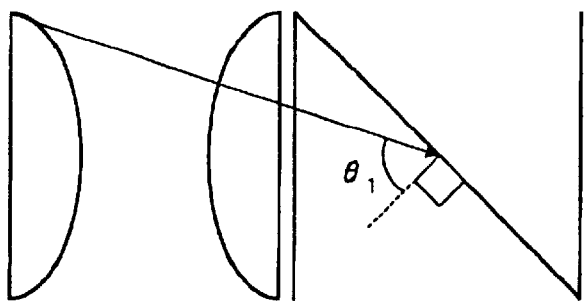
$\theta_1$
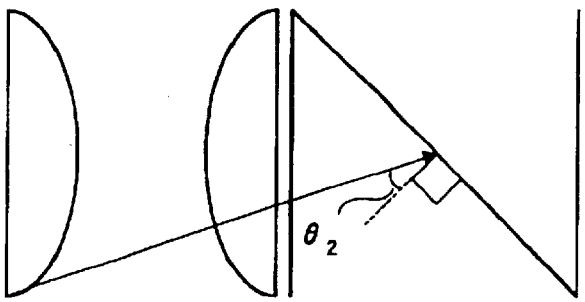
$\theta_2$

POLARIZED LIGHT SEPARATION DEVICE, METHOD OF FABRICATING THE SAME AND PROJECTION DISPLAY APPARATUS USING THE POLARIZED LIGHT SEPARATION DEVICE

TECHNICAL FIELD

This invention relates to a polarized light separation device, a method of fabricating the device and a projection display apparatus that uses this polarized light separation device.

BACKGROUND ART

FIG. 26 is a perspective drawing of a conventional polarization beam splitter. This device comprises triangular prisms to which polarized light separation films and aluminum reflective films are vapor-deposited and then the prisms are pasted together. To wit, prisms 71, 72, 73 and 74 are polished prisms made of the material BK7, and these four prisms form a unit that is repeated to make up the entire device. A polarized light separation film 75 is formed by vapor deposition as inorganic thin films on that surface of the prism 72 which is facing the prism 71. In addition, an aluminum reflective film 76 is vapor-deposited on that surface of the prism 73 which is facing the prism 74. The prisms 71, 72, 73 and 74 are pasted to each other's surfaces with adhesive. When a light beam 77 enters the prism 72, at the polarized light separation film 75, the P-polarized light component with respect to the plane of incident light passes through the prism 71 as transmitted light 77 and exits. On the other hand, the S-polarized light component is reflected by the polarized light separation film 75 then enters the prism 73, is reflected by the reflective film 76 and leaves the device as an S-polarized light beam 78. In this manner, a conventional polarization beam splitter is formed by pasting together prisms each of that has a polarized light separation film or a reflective film in a repetitive structure.

In the conventional method, the triangular prisms are each individually polished, vapor-deposited and pasted together, so it is not possible to reduce the size of the repetitive structure of polarized light separation film and reflective film to give the entire device a thin structure. This is because, were the size of the repetitive structure to be reduced, even smaller triangular prisms would need to be manufactured, and the edges of the prisms would be lost due to polishing so no light will pass through them, resulting in the problem of decreased brightness. In addition, achieving uniform heights among the prisms becomes more difficult the smaller the prism becomes. In addition, problems at the time of pasting the prisms together include angular misalignment, unevenness and bumpiness in the surfaces of light entry and exit, and other problems. Therefore, the edge areas that stick out due to unevenness are susceptible to cracking, and it is difficult to attach other optical elements to the surfaces of light entry and exit. In addition in the event of angular misalignment at the time that the prisms are pasted together, problems occur in which the optic axes of the incident light and emitted light change. The present invention gives proposed solutions to these problems.

DISCLOSURE OF THE INVENTION

In order to solve at least part of the above problems, a first method of the present invention is a method of manufacturing a polarized light separation device that separates light having random directions of polarization into two types of polarized light, comprising the steps of: forming a substrate block having a repetitive structure of a first substrate plate, a polarized light separation layer, a second substrate plate and a reflective layer; and cutting the substrate block at a predetermined angle with respect to surfaces of the substrate plates.

The above method has the meritorious effect that there is no need to polish the surfaces for the individual polarized light separation layers and reflective layers. In addition, it has the meritorious effect that the degree of parallelism between the repeated polarized light separation layers and reflective layers is higher than that of a structure wherein individual tetrahedral prisms are pasted together. Moreover, polarized light separation devices of the same structure with the same characteristics can be manufactured easily in large numbers by cutting them out of the substrate block.

In the first method, the step of forming a substrate block preferably comprises the steps of: forming the polarized light separation layers upon the first substrate plates; forming the reflective layers upon the second substrate plates; and alternately stacking the first substrate plates upon which the polarized light separation layers are formed and the second substrate plates upon which the reflective layers are formed. In this manner, the substrate block can be formed easily.

Further in the first method, in the step of alternately stacking the first substrate plates upon which the polarized light separation layers are formed and the second substrate plates upon which the reflective layers are formed, it is preferable that the first substrate plates and the second substrate plates are stacked alternately with their ends slightly offset by an amount depending on an angle at which the substrate block is to be cut.

By stacking the substrates with their ends slightly offset, the amount of substrate waste generated at the time of cutting of the substrate blocks can be reduced.

In the first method, the step of forming a substrate block preferably comprises the steps of: forming the polarized light separation layers upon the first substrate plates; forming the reflective layers upon the second substrate plates; stacking together one of the first substrate plates upon which the polarized light separation layers are formed and one of the second substrate plates upon which the reflective layers are formed, to thereby form a basic block; and stacking together a plurality of the basic blocks. In this manner, by merely stacking multiple substrate blocks, substrate blocks of the desired size can be formed easily.

In the step of stacking together a plurality of the basic blocks, the basic blocks are preferably stacked with their ends slightly offset by an amount depending on an angle at which the substrate block is to be cut. In this manner, the amount of substrate waste generated at the time of cutting of the substrates can be reduced.

Preferably the first method further comprises the step of: polishing a cut surface after the step of cutting the substrate block at a predetermined angle. The two cut surfaces polished in this manner will become flat surfaces of light entry and exit.

Preferably the first method further comprises the step of: stacking a dummy substrate upon at least one of the substrates making up both surfaces of the substrate block after the substrate block is formed. In this manner, the periphery is not damaged by cracking or breakage, and the loss of light passing through the periphery can be reduced.

Preferably, in the first method, the first substrate plate and the second substrate plate are polished glass plates. The polished glass plate is preferably white glass plates or non-alkali glass. Alternately, the first substrate plate and the second substrate plate are preferably float glass. By using polished plate glass or float glass, the precision of repetition of the polarized light separation film and reflective film can be easily improved inexpensively.

In the first method, one of the first substrate plate and the second substrate plate is preferably a colored light-transparent substrate and the other is a colorless light-transparent substrate. In this manner, the positions of the polarized light separation layers and reflective layers can be easily distinguished.

The reflective film may be made of a thin aluminum film or a thin dielectric film. Alternatively, the reflective film may be made of a thin aluminum film and a thin dielectric film.

A first polarized light separation device according to the present invention is manufactured by any one of the above methods of manufacturing a polarized light separation device. By means of this polarized light separation device, the repetitive structure of polarized light separation layers and reflective layers can be set depending on the thickness and quantity of substrates. In other words, by fine repetition, a large number of repetitive structures can be comprised within a thin substrate. The degree of parallelism between the repeated polarized light separation layers and reflective layers is determined by the precision of the substrate, so a high degree of parallelism can be obtained easily. In addition, the arrangement of repetition can also be configured regularly with high precision. In addition, the surfaces of light entry and exit are clean so phase plates may be attached, anti-reflection films can be applied and other processing can be performed easily.

The first polarized light conversion device preferably comprises: polarized light conversion means, provided on a light exit surface side of the polarized light separation device, for converting light having two types of polarized light components separated from the polarized light separation layer into light having one type of polarized light component. In this manner, light having two types of polarized light components can be provided as incident light and light having one type of polarized light components can be obtained as emitted light.

The polarized light conversion means is preferably a $\lambda/2$ phase layer provided against one of a light exit surface of the first substrate and a light exit surface of the second substrate. In this manner, one type of linearly polarized light can be obtained as emitted light.

In the polarized light conversion device, an anti-reflection film is preferably provided on at least one of a light entry surface side and a light exit surface side. In this manner, the loss of light due to reflection at the surface can be reduced.

A first projection display apparatus according to the present invention comprises: a light source, an integrator optical system having a first lens plate and second lens plate that divide light from the light source into a plurality of light fluxes; any one of the above mentioned polarized light conversion devices; modulation means for modulating light emitted by the polarized light conversion device; and a projection optical system that projects the light modulated by the modulation means.

A second projection display apparatus according to the present invention comprises: a light source; an integrator optical system having a first lens plate and a second lens plate that divide light from the light source into a plurality of light fluxes; any one of the above mentioned polarized light conversion devices; a color-separating optical system that separates light emitted from the polarized light conversion device into light of a plurality of colors; modulation means for individually modulating the plurality of colors of light separated by the color-separating optical system; a synthesizing optical system that synthesizes the light modulated by the modulation means; and a projection optical system that projects the light synthesized by the synthesizing optical system.

It is preferably that transmittance characteristic of the polarized light separation film is adjusted so that differences in transmittance with respect to light of a wavelength corresponding to peaks at various colors are at most about 5% when the light of a wavelength corresponding to the peaks at various colors in the spectrum of the light that enters the polarized light separation film enters at a difference in an angle of incidence within a predetermined range.

A second polarized light separation device according to the present invention comprises: a substrate block having a light entry surface, a light exit surface substantially parallel to the light entry surface, and a plurality of light-transparent substrates, which are pasted together sequentially at a plurality of interfaces that assume a predetermined angle with respect to the light entry surface and the light exit surface, the substrate block further having a plurality of polarized light separation films and a plurality of reflective films provided alternately on the plurality of interfaces; and a position-identifying part provided on at least one of two side surfaces of the substrate block formed roughly perpendicularly to the plurality of interfaces, the position-identifying part being usable at the time of positioning of the polarized light separation device.

By means of the second polarized light separation device, a position-identifying part is provided on the side surface of the polarized light separation device, so when the polarized light separation device is used in another apparatus, it can be positioned relatively accurately.

In the second polarized light separation device, the position-identifying part is preferably located at a position which is roughly equidistant from two other side surfaces adjacent to the side surfaces upon which the position-identifying part is provided. In this manner, the positioning precision at the center of the optical element can be increased.

Alternatively, the position-identifying part is preferably located at a position which has different distances from the two other side surfaces adjacent to both of the side surfaces upon which the position-identifying part is provided. In this manner, the orientation of the polarized light separation device can be determined from the position-identifying part.

The position-identifying part may be a projection provided on the side surface; or the position-identifying part may be an indentation provided on the side surface. Alternatively, the position-identifying part may be a portion marked with a particular color different than that of the rest of the side surface.

A second method of manufacturing a polarized light separation device according to the present invention comprises the steps of: (a) alternately pasting together a plurality of light-transparent substrates at a plurality of interfaces to form a compound plate member that has a plurality of polarized light separation films and a plurality of reflective films provided alternately on the plurality of interfaces; (b) cutting the compound plate member at a predetermined angle with respect to the plurality of interfaces to generate a substrate block that has substantially parallel light entry and light exit surfaces; and (c) polishing the light entry surface and the light exit surface of the substrate block;

wherein the step (a) comprises the step of forming an position-identifying part, that is usable at the time of positioning of the polarized light separation device, on at least one of side surfaces of the substrate block formed roughly perpendicular to the plurality of interfaces. Thus the aforementioned second polarized light separation device can be manufactured by means of the second method.

The second method preferably comprises the step of: (d) polishing the light entry surface and the light exit surface of the substrate block. In this manner, surfaces of light entry and exit of the substrate block forming the polarized light separation device can be polished easily, so the polarized light separation device can be manufactured easily.

In the second method, the step (a) preferably includes the step of: forming a projection as the position-identifying part by offsetting at least some of the plurality of light-transparent substrates from the other light-transparent substrates. In this manner, the projection used as the position-identifying part can be formed precisely and easily.

A polarized light conversion device according to the present invention comprises: a polarized light separation device according to any one of the above second method for a polarized light separation device; and polarized light conversion means, provided on a light exit surface side of the polarized light separation device, for converting light having two types of polarized light components separated from the polarized light separation layer into light having one type of polarized light component.

The polarized light conversion means preferably is a λ/2 phase layer provided against the light exit surface of every other substrate among the light exit surfaces of the substrates. Further, an anti-reflection film is preferably provided on at least one of the light entry surface side and the light exit surface side.

A third projection display apparatus according to the present invention comprises: a light source; an integrator optical system having a first lens plate and a second lens plate that divide the light from the light source into a plurality of light fluxes; a polarized light conversion device according to any one of the seventh invention; modulation means for modulating light emitted by the polarized light conversion device; and a projection optical system that projects the light modulated by the modulation means.

A fourth projection display apparatus according to the present invention comprises: a light source; an integrator optical system having a first lens plate and a second lens plate :that divide the light from the light source into a plurality of light fluxes; a polarized light conversion device according to any one of the seventh invention; a color-separating optical system that separates light emitted from the polarized light conversion device into light of a plurality of colors; modulation means for individually modulating the plurality of colors of light separated by the color-separating optical system; a synthesizing optical system that synthesizes the light modulated by the modulation means; and a projection optical system that projects the light synthesized by the synthesizing optical system.

BRIEF DESCRIPTION OF DRAWINGS

FIG. 8 is an explanatory diagram showing the process of manufacturing a polarized light separation device for use in LCD projectors from a block cut along the cutting surfaces 84a and 84b of FIG. 7(A).

FIG. 12 is an explanatory diagram showing the process of manufacturing a polarized light separation device for use in LCD projectors from a block cut along the cutting surfaces 328a and 328b of FIG. 8(A).

FIG. 18 is an explanatory diagram showing the trouble that occurs when the light entry surface and reflection surface are inadvertently interchanged.

FIG. 19 is a schematic structural diagram showing a plan view of the important portions of a polarized light illumination apparatus having an array of beam splitters based on the preferred embodiment.

FIG. 20 is a schematic structural diagram showing the important portions of the projection display apparatus 800 equipped with a polarized light illumination apparatus 500.

FIG. 23 is an explanatory diagram showing the angle of incidence of light incident to the polarized light separation film.

BEST MODE FOR CARRYING OUT THE INVENTION

Here follows an explanation of the method of manufacture of the polarized light separation device (called an "optical element") according to the present invention along with the structure of the polarized light separation device, made with reference to preferred embodiments.

A. First Preferred Embodiment

Figure 1:
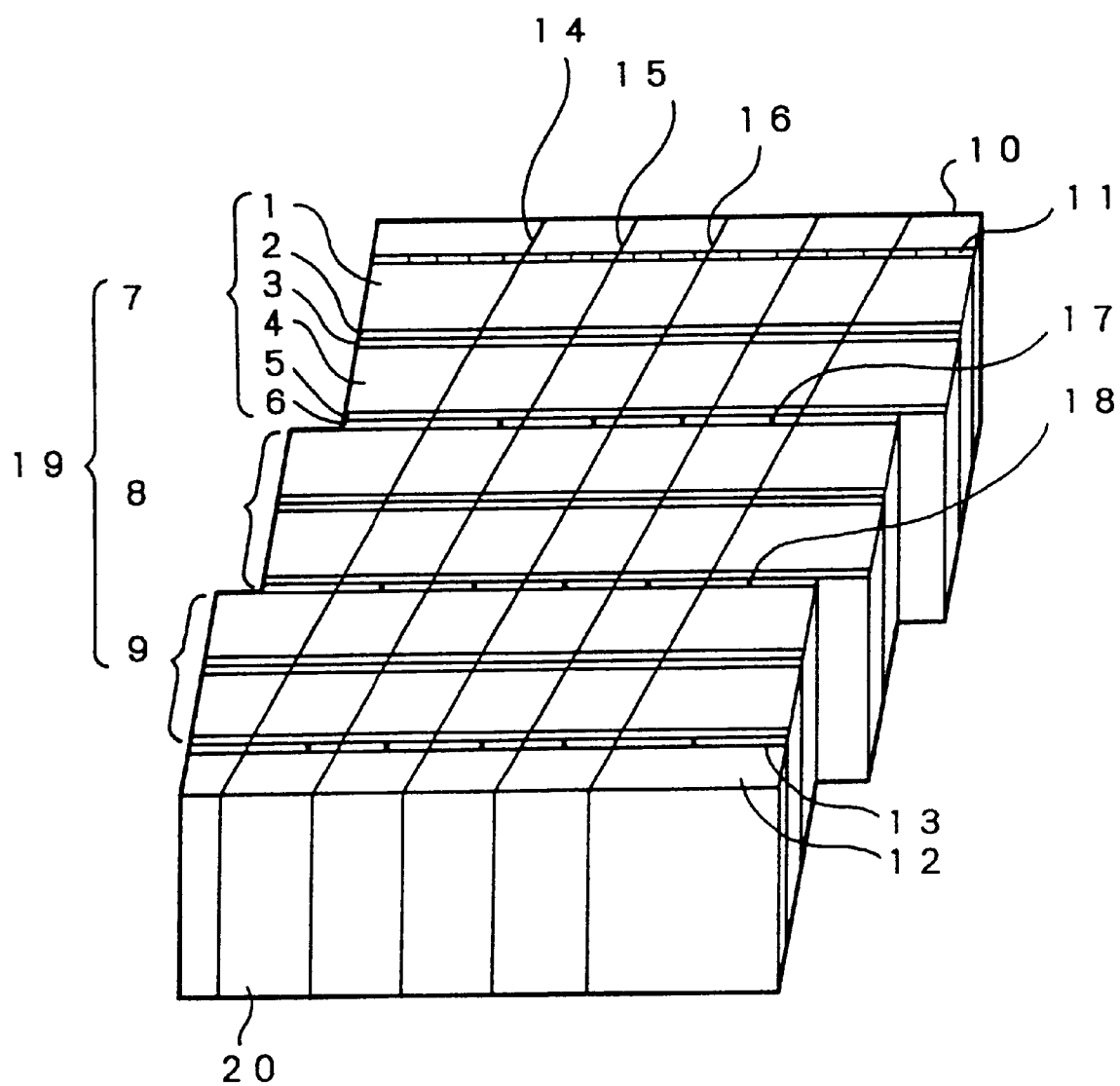
FIG. 1 is a perspective view showing the method of manufacturing the polarization beam splitter of a first preferred embodiment of the present invention.

FIG. 1 is a perspective view showing the method of manufacturing the polarization beam splitter of the present invention. Onto blue-plate float glass 1 is vapor-deposited a polarized light separation film 2 of a structure consisting of multiple thin layers of inorganic material. In addition, onto blue-plate float glass 4 is deposited a reflective film of aluminum. The reflectivity is increased by the vapor deposition of one or more layers of a thin film of inorganic material between this reflective film 5 of aluminum and the blue-plate float glass 4. These two pieces of blue-plate float glass 1 and 4 are pasted together with adhesive 3 to form a basic structural glass body 7. Basic structural glass bodies 8 and 9 are also constructed in the same manner and are pasted together with adhesive 6 with their ends slightly offset. A group of several basic structural glass bodies pasted together in this manner is called a glass block 19. As described later in detail, pieces of dummy glass 10 and 12 are provided on both surfaces of the glass block 19.

In this Description, plate-shaped transparent members such as plate glass or dummy glass are called "transparent substrates" or simply "substrates." In addition, a glass block 19 formed by pasting together plate glass or dummy glass, or a block cut from this is called a "substrate block."

Figure 2:
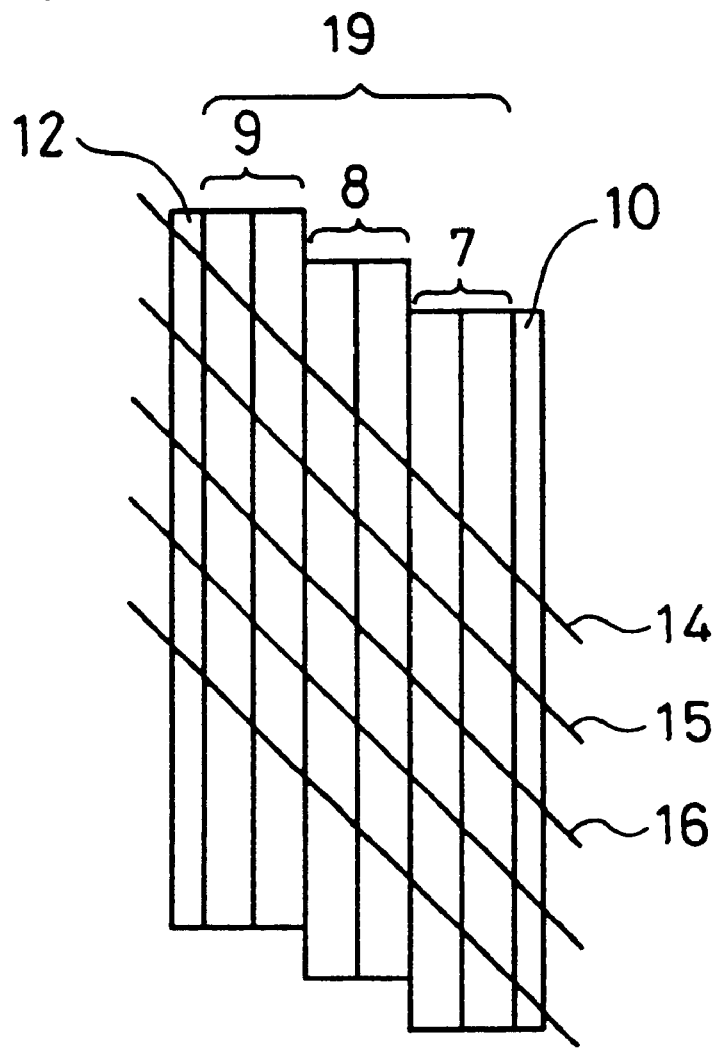
FIG. 2 shows a top view and front view of the substrate block shown in FIG. 1.
Figure 2:
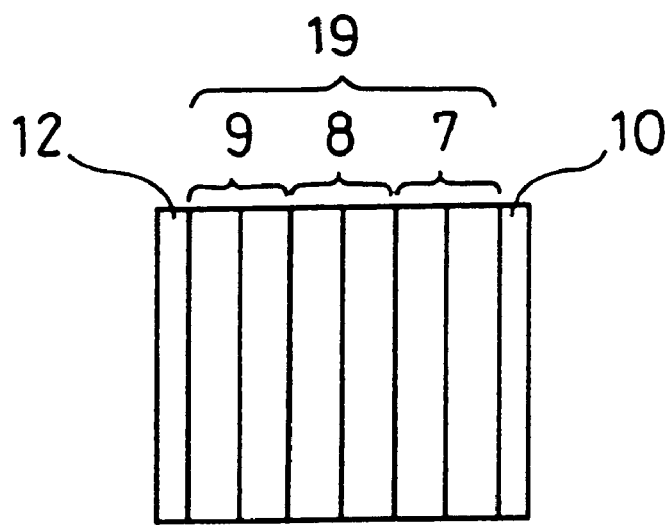
Figure 3A:
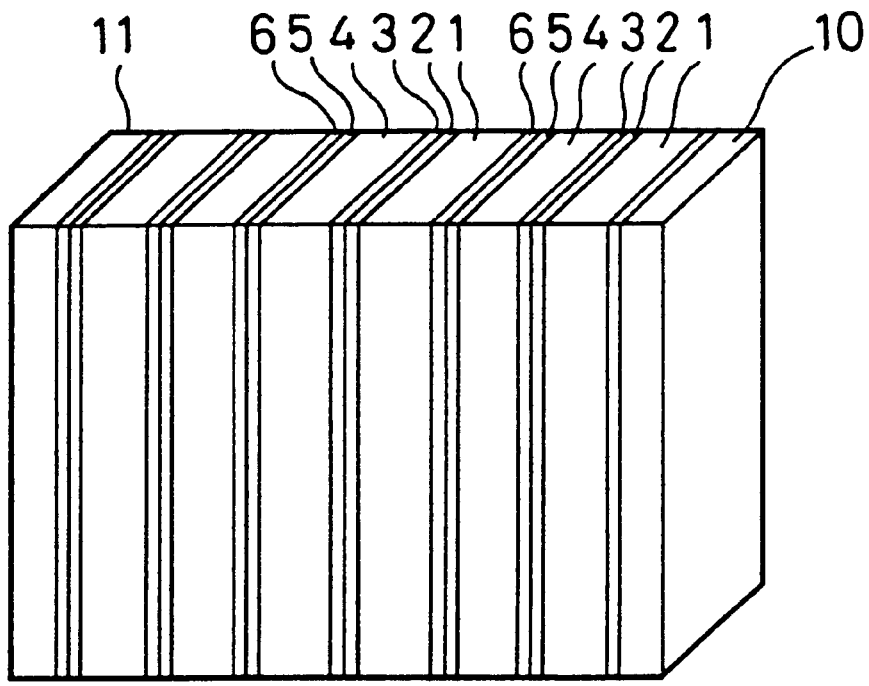
FIG. 3 shows a perspective view and sectional view of the polarization beam splitter of the first preferred embodiment.
Figure 3B:
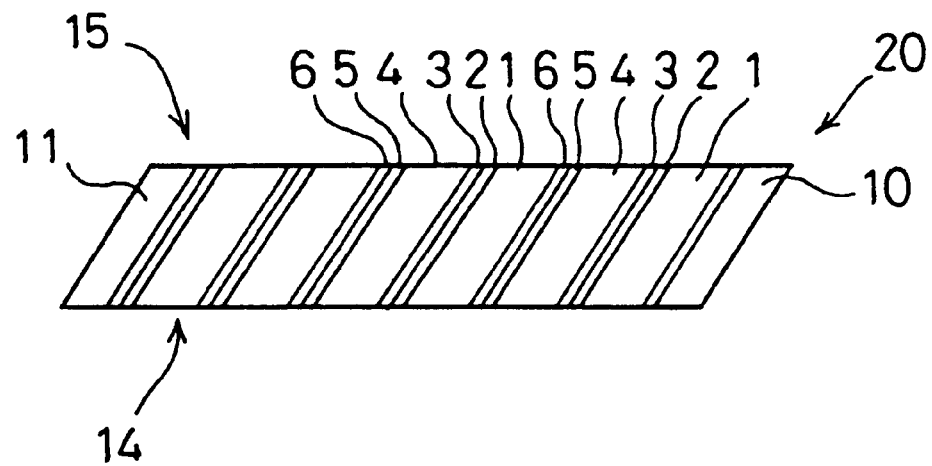

FIG. 2 shows a top view and front view of the substrate block shown in FIG. 1. This substrate block is cut with a cutting machine along the cutting planes 14, 15, 16 . . . In FIG. 2, the adhesive 3, polarized light separation film 2 and reflective film 5 are omitted. As is evident from FIG. 1, in this preferred embodiment, the cutting planes 14, 15, 16 . . . are cut at an angle of 45° with respect to the polarized light separation film 2 and reflective film 5. Finally, upon polishing the cut surface a polarization beam splitter can be obtained. FIG. 3(A) is a perspective view of the polarization beam splitter thus obtained, and FIG. 3(B) is a sectional view. By cutting both ends of this polarization beam splitter 20 to form a rough rectangular parallelepiped, it is more conveniently assembled into a projection display apparatus or other optical apparatus.

In this polarization beam splitter 20, the polarized light separation surfaces and reflective surfaces are lined up alternately at an angle of 450 with respect to the cutting planes 14 and 15. With this structure, one can see that the gap between the polarized light separation film 2 and reflective film 5 of aluminum is determined by the thickness of the pieces of blue-plate float glass 1 and 4. In other words, by using thin plates, it is possible to form a polarization beam splitter with a very fine pitch. This cannot be done with the conventional method of pasting together triangular prisms. In addition, in this preferred embodiment, the cutting planes 14, 15, 16 . . . are polished in the last step, so a high degree of flatness can be obtained on the surfaces of light entry and exit. In other words, the problems of mutual misalignment when the triangular prisms are pasted, unevenness in the surfaces of light entry and exit corresponding to the cutting planes 14, 15, 16 . . . , and leakage of adhesive which fouls the surfaces of light entry and exit are solved. As a result, there are meritorious effects in that when light enters the polarization beam splitter 20 from a direction perpendicular to the cutting planes 14, 15, 16 . . . , a straight optic axis is maintained, and the light does not scatter. In addition, by using blue-plate float glass as the material, the repeating gap between the polarized light separation film 2 and reflective film 5 can be controlled with the thickness of the glass, so by creating the glass block 19 from the same large piece of float glass, the gap between the polarized light separation film and reflective film can be made uniform. Therefore, by adopting a polarization beam splitter. according to the preferred embodiment in an LCD projector or other projection display apparatus, the repetitive positional accuracy of the polarized light separation film and reflective film is high and its parallelism is also high, so the efficiency of the polarized separation of light can be increased.

In addition, in this embodiment, the pieces of dummy glass 10 and 12 provided on both surfaces of glass block 19 in order to prevent cracking and breakage are attached with adhesives 11 and 13. These pieces of dummy glass 10 and 12 are used to prevent the sharp corners of the plate-shaped polarization beam splitter from cracking or breaking when it is cut from the glass block 19. In other words, since the edges of this dummy glass crack and break, this prevents the blue-plate float glass 1 which has the polarized light separation film 2 from cracking or breaking.

In addition, the manufacturing method of this embodiment has the advantage in that large numbers of polarization beam splitters with the same precision and the same structure can be manufactured at once. In other words, by placing a glass block 19 in the cutting machine, and cutting along the cutting planes 14, 15, 16 . . . , polarization beam splitters with the same precision and the same structure are obtained. By using the manufacturing method of this embodiment in this manner, the advantage of permitting the mass production of polarization beam splitters with the same precision and the same structure is gained. These advantages are more effective the smaller the size of prisms pasted together and the larger the number of glass plates pasted together. While in this embodiment, cutting is performed such that the cutting planes 14, 15, 16 . . . form an. angle of 45° with respect to the polarized light separation film 2 and reflective film 5, but this angle need not necessarily be 45°.

In addition, since blue-plate float glass is used for the glass in this embodiment, polishing of the surface for vapor deposition is unneeded. In other words, using the raw material unmodified gives sufficient precision. This is markedly superior to the conventional manufacturing method involving the pasting together of triangular prisms that are polished on three sides. In addition, the point that glass breakage during cutting and polishing occurs only on the periphery is also superior from the standpoint that light losses are reduced. In addition, at the time of vapor deposition of multiple thin films, deposition on a large plate of glass provides for simpler handling and inspection, so this has the advantage in that a better quality vapor-deposited film is obtained. By using polished plate glass instead of blue-plate float glass, it is possible to improve precision further.

In this embodiment, since the basic structural glass bodies 7, 8 and 9 are first made by pasting together two pieces of plate glass, a polarization beam splitter of good quality can be obtained. This is because it is possible to confirm visually that no bubbles are present, and that the adhesive hardens uniformly. The light passing through these basic glass bodies is important, as the light reflected between adjacent basic structural glass bodies is not originally effective light. In the adhesion of basic glass body to basic glass body, it is not possible to check for bubbles since there are several layers of a reflective film of aluminum, so there are cases in which unevenness in adhesion occurs. However, the presence of bubbles 17 or unevenness 18 does not matter as long as the adhesion is good. In other words, by means of the manufacturing method of this preferred embodiment, the quality is assured for the important areas of adhesion within the basic structural glass body, so the polarized light separation characteristics are superior.

While the reflective film 5 may be formed solely of aluminum film, but by forming the reflective film 5 of an aluminum film and a multi-layer dielectric film (thin-film dielectric) as in this example, its reflectivity can be increased by 3% to 5%. This not only increases the efficiency of usage of light but also reduces the absorption of light by the reflective film 5, suppressing the radiation of heat by the polarization beam splitter, leading to increased reliability.

Figure 4:
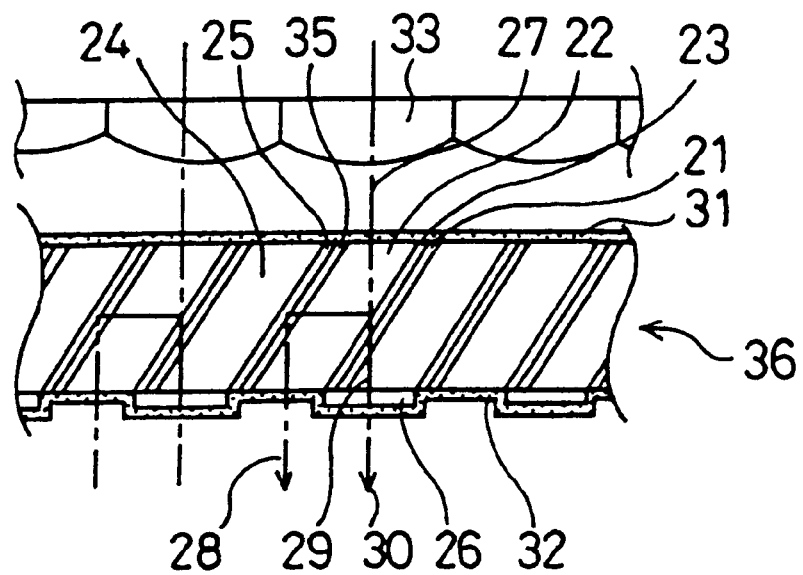
FIG. 4 is a sectional view of the polarization beam splitter of the first preferred embodiment and one preferred embodiment of a polarized light conversion device using that polarization beam splitter.

FIG. 4 shows another example of the polarization beam splitter of the present invention and a sectional view of a polarized light conversion device using that polarization beam splitter. In the polarization beam splitter shown in FIG. 3, two pieces of blue-plate float glass 1 and 4 are used, but in this embodiment, one piece of white plate glass 22 and one piece of blue plate glass 24 are used instead. 23 denotes a polarized light separation film, formed by vapor deposition of numerous layers of two different types of inorganic material upon the white plate glass 22. 25 denotes a reflective film of aluminum that is vapor-deposited upon blue plate glass 24. These are adhered together with adhesive 35. The white plate glass 22 upon which the polarized light separation film 23 is vapor-deposited and the blue plate glass 24 upon which the reflective film 25 is vapor-deposited are pasted together alternately with adhesive, and the whole forms a polarization beam splitter 36. The method of manufacturing this polarization beam splitter 36 comprises, as described above, alternately adhering large flat plates of white plate glass 22 which have a polarized light separation film 23 and large flat plates of blue plate glass 24 which have a reflective film 25 of aluminum, and then cutting them obliquely with respect to the adhesive surfaces to form plate-shaped blocks and polishing the cut surface. Therefore, the polarization beam splitter 36 of this preferred embodiment is characterized in that the white plate glass 22 and blue plate glass 24 are connected without unevenness and have an integrated structure. While the precision is determined by the constituent white plate glass 22 and blue plate glass 24, considerably high precision can be expected. Since the precision in thickness of typical plate glass is greater the thinner the glass, as the pitch of the polarized light separation film 23 and reflective film 25 becomes finer and the thickness of the polarization beam splitter 36 becomes thinner, the precision increases. In other words, a thin and high-precision polarization beam splitter can be obtained.

In addition, 31 and 32 denote anti-reflection films formed at low temperature as thin films of inorganic materials in order to prevent light from being reflected from the surface. Forming the anti-reflection films 31 and 32 at low temperature on both the light entry surface side and the light exit surface side prevents the adhesive force of the adhesives 21 and 35 from degrading at the time of thin-film formation, and prevents the glass from coming apart or slipping. The low-temperature formation of these anti-reflection films 31 and 32 permits a structure having no loss of light at the surface. At the bottom. surface (light exit surface) of the blue plate glass forming the polarization beam splitter 36 is provided a λ/2 phase plate 26. The anti-reflection film 32 formed at low temperature is formed after this λ/2 phase plate 26 is pasted to the blue plate glass 24.

The polarization beam splitter 36, the selectively provided λ/2 phase plate 26 and a lens group 33 formed rectangularly take a light beam having a random axis of polarization (hereafter called "randomly polarized light") and convert it to a light beam having a one-directional axis of polarization. Here follows a description of this system. The lens group 33 is a set of lenses spaced at the same pitch as the width of the white plate glass 22 and blue plate glass 24 in the polished state of the block with one piece each adhered. When light enters the lens group 33, it is focused on the polished surface of the white plate glass 22 as a light beam 27. This polished surface has an anti-reflection film 31 so there is no loss of light here and nearly all of it enters the interior of the white plate glass 22. The polarized light separation film 23 separates the light beam 27 into P-polarized light 29 and S-polarized light 28. The polarized light 28 is reflected by the reflective film 25 of aluminum and then passes through the anti-reflection film 32 and exits. The optic axis of the λ/2 phase plate 26 is set to 45° with respect to the polarization axis of P-polarized light. Therefore, the P-polarized light 29 has its optic axis rotated by 90° by the λ/2 phase plate and becomes S-polarized light 30 having the same optic axis as the S-polarized light 28. As described above, by means of the preferred embodiment, from randomly polarized light 27 can be obtained S-polarized light 28 and 30 of a uniform optic axis. In this preferred embodiment as described above, by combining the polarization beam splitter 36 with a lens group 33 and λ/2 phase plate 26, and applying anti-reflection films 31 and 32 formed at low temperature, it is possible to implement a polarized light conversion device that efficiently creates one type of polarized light from randomly polarized light.

The polarization beam splitter 36 of this embodiment is formed by vapor-depositing a polarized light separation film made up of a multilayer thin film of inorganic material upon one piece of plate glass and vapor-depositing a reflecting film of aluminum upon another piece of plate glass and then cutting and polishing, so a thin plate-shaped construction that depends on the thickness of the plate glass is possible. In addition, since the plate glass with the longer light-path length over which the light reflected by the polarized light separation film 23 passes is made of white plate glass 22, this has the advantage of suppressing the absorption of light there. In addition, since the other piece of glass is blue plate glass 24, it is easy to distinguish the white plate glass 22 and the blue plate glass 24. Therefore, by making the glass positioned at the extreme left and right sides white glass on one side and blue glass on the other, it is easy to distinguish the locations of the polarized light separation film and the reflective film. Thus, when a thin film of inorganic material is provided between the reflective film 25 of aluminum and the white plate glass 22 in order to increase the reflectivity considerably, this eliminates the possibility of inadvertently reversing the positions of the polarized light separation film and reflecting surface of the reflective film and negating this advantage.

Figure 5:
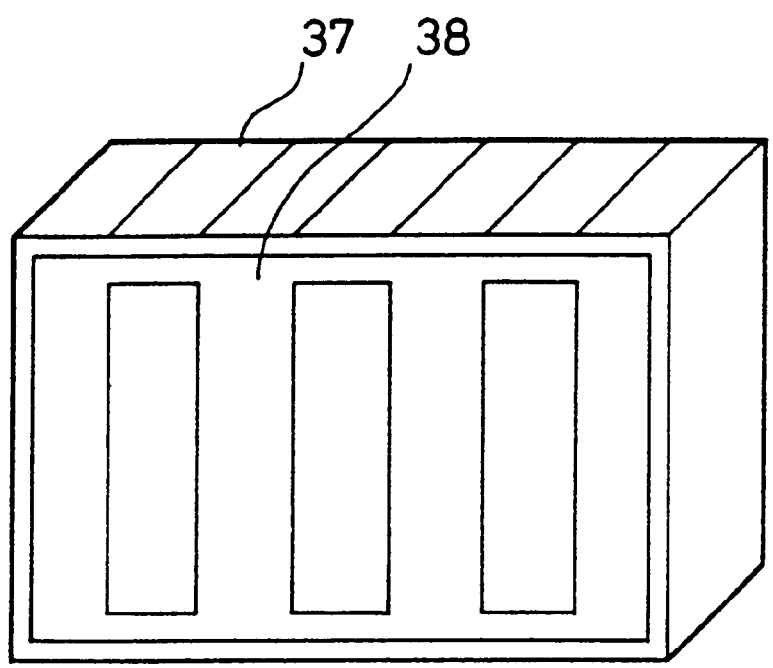
FIG. 5 is a perspective view of the polarization beam splitter shown in FIG. 4, to which is attached a λ/2 phase plate.

In addition, since cutting and polishing are performed after pasting together the glass plates to manufacture the polarized light conversion device, it is possible to provide a compact polarized light conversion device with a fine pitch. In addition, when the repeated pitch becomes fine, the λ/2 phase plate 38 can be given a configuration wherein windows are opened in strip fashion as shown in FIG. 5, and this can be provided on the light exit surface side of the polarization beam splitter 37.

As described above, by means of the aforementioned manufacturing method, a glass block formed by alternately pasting together plate glass with a polarized light; separation film made up of a multi-layer thin film of inorganic material upon its surface and plate glass with a reflecting film upon its surface is cut at a predetermined angle with respect to the pasted surfaces, the repetitive structure of polarized light separation film and reflective surfaces can be set depending on the thickness and number of pieces of plate glass. In other words, a polarization beam splitter can be formed in a thin plate by fine repetition using a structure with a large number of repetitions, and the parallelism of each surface is determined by the precision of the glass, so a structure with a high precision and a high degree of parallelism can be obtained and also a high precision in the pitch of repetition of polarized light separation surfaces and reflective surfaces can be obtained. In addition, the surfaces of light entry and exit are uniform so phase plates may be attached, anti-reflection films can be applied and other processing can be performed easily.

Regarding the manufacturing method, since polishing of the surfaces of the individual polarized light separation films and reflective films is unnecessary, this has advantages in that the degree of parallelism of the repeated polarized light separation films and reflective films is higher than in a structure wherein individual tetrahedral prisms are pasted together, there is no cracking or breakage of the polarized light separation surfaces or reflective surfaces, and large numbers of polarization beam splitters having the same characteristics can be created easily by cutting them from plate glass. In addition, since the vapor deposition of the polarized light separation film and reflective film is performed on the plate glass without modification, there is no need for special vapor deposition methods and the quality of the films can be easily inspected. If inspection is easy, then the characteristics are easily identified, and mass production is also stabilized.

In addition, by forming each basic structural glass body by pasting one piece of plate glass with a polarized light separation film and one piece of plate glass with a reflective film, it is possible to suppress bubbles and unevenness in adhesion in the pasted areas through which effective light passes.

In addition, by using plate glass and float glass, the precision of repetition of the polarized light separation films and reflective films can be increased easily and inexpensively.

In addition, by providing polarized light conversion means that causes the state of polarization at the light exit surface of the polarization beam splitter, it is possible to create. a polarized light conversion device that can convert randomly-polarized light to polarized light that has the same state of polarization. If such a polarized light conversion device is used in an LCD projector or other projection display apparatus, nearly all of the light emitted from the light source can be used as illuminating light, so the brightness of the projected image can be increased appreciably. Note that in the embodiment described above, this structure was achieved by selectively providing a λ/2 phase plate on the light exit surface of the polarization beam splitter, but the means of performing polarized light conversion is not limited to this method.

In addition, since the anti-reflection films consisting of thin films of inorganic material are formed at low temperature on the surface of the polarization beam splitter, a structure that prevents loss of light at the surface can be implemented without damaging the adhesive used in the interior of the polarization beam splitter. In particular, if the polarized light conversion means is provided on the surface and the λ/2 phase plate is pasted and then the anti-reflection films are formed at low temperature, their effect is large.

In addition, by adopting a structure wherein dummy glass used to prevent cracking and breakage is pasted to both ends, loss due to cracking or breakage of the polarized light separation films present at both ends is eliminated. In other words, there is no waste of the light that passes through these portions. In the aforementioned embodiment, dummy glass is provided on both ends, but a structure wherein it is provided on one side only may also be adopted.

In addition, by making one of either the piece of plate glass vapor-deposited with polarized light separation film or the piece of plate glass vapor-deposited with reflective film white plate glass or non-alkaline glass, and making the other a piece of colored glass, the positions of the polarized light separation surfaces and reflective surfaces can be made clear, so the front and back can be easily distinguished.

A reflective film other than an aluminum film can be used; for example, a multi-layer dielectric film can be used. If a reflective film made of aluminum is used, this has advantages in that the reflectivity does not depend on the angle of incidence of light, and the light emerging from the polarization beam splitter is resistant to color variations. On the other hand, by using a reflective film consisting of a multi-layer dielectric film (thin-film dielectric), it is possible to increase the reflectivity.

In addition, a light source, a first lens plate consisting of multiple rectangular lenses, and a second lens plate consisting of the same number of focusing lenses as the multiple rectangular lenses making up the aforementioned first lens plate can form an integrator illumination system, which can be combined with the above-mentioned polarized light conversion device, to obtain a polarized light illumination apparatus that converts the randomly polarized light emitted from the light source to polarized light having the same state of polarization. In conventional projection display apparatus, either the P-polarized light flux or the S-polarized light flux is absorbed by a polarizing plate provided in the modulation element of the LCD panel or the like, but by using this polarized light illumination apparatus, this absorption of light does not occur. Thus, the efficiency of light utilization is high and a bright projection display apparatus can be obtained.

In addition, if one creates a projection display apparatus by combining the above-mentioned polarized light conversion device and integrator illumination system, a bright screen with no unevenness is obtained. In addition, if one increases the number of lens divisions in the lens plate comprising the integrator illumination system with the purpose of further increasing the uniformity and brightness of illumination, by means of the aforementioned structure of the polarized light conversion device, it is easy to increase the number of polarized light separation films of the polarization beam splitter in a corresponding manner. In other words, one need merely use thinner and more sheets of the plate glass to be pasted together. In addition, the greater the number of polarized light separation films, the thinner the size of the polarization beam splitter becomes, so it is even more easily arranged in an optical system. Therefore, if the above-mentioned polarized light conversion device is used, a bright projection display device without variations in illumination can be provided.

B. Second Preferred Embodiment

Figure 6:
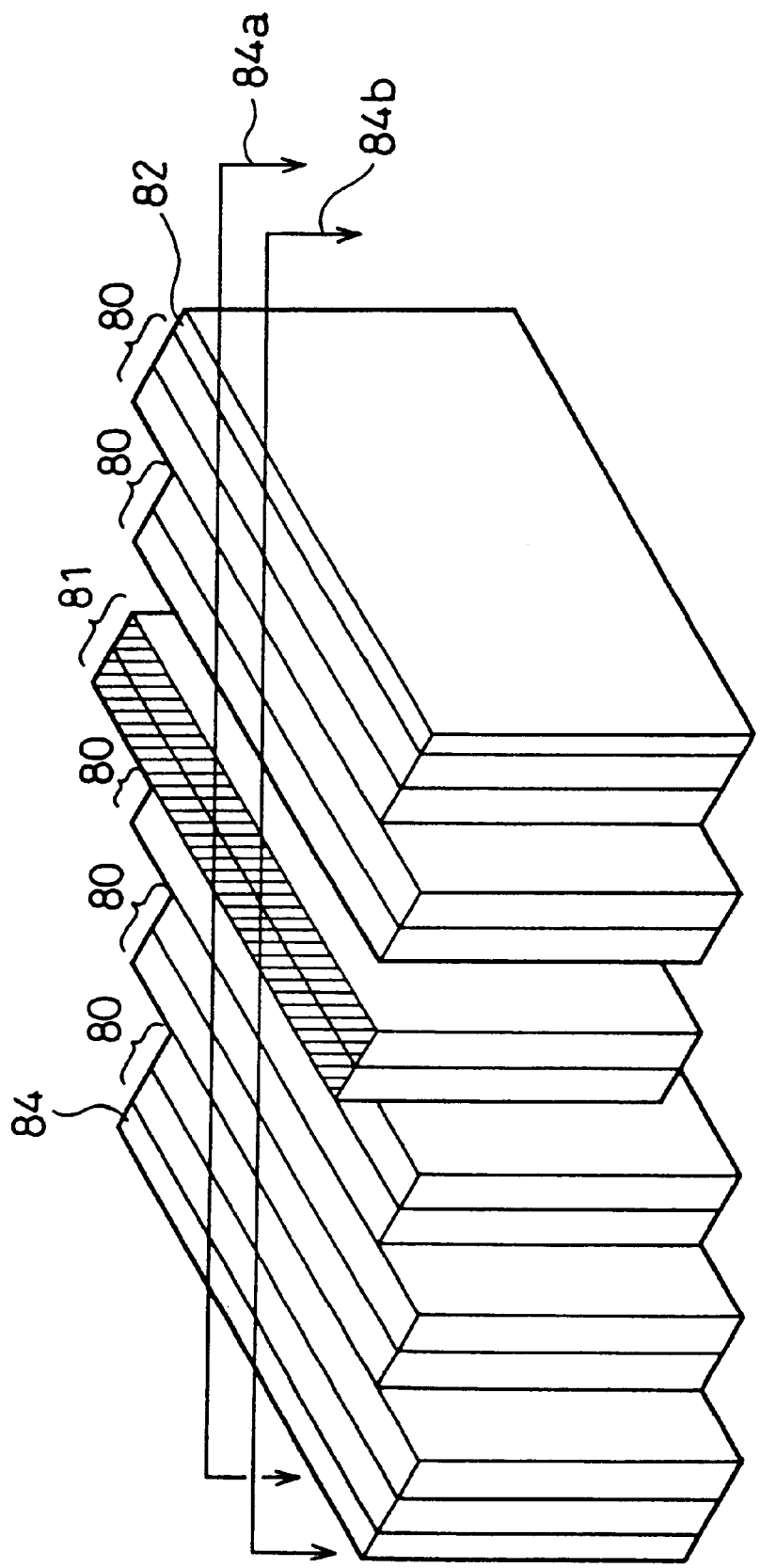
FIG. 6 is a perspective view showing the method of manufacturing the polarization beam splitter of a second preferred embodiment.
Figure 7A:
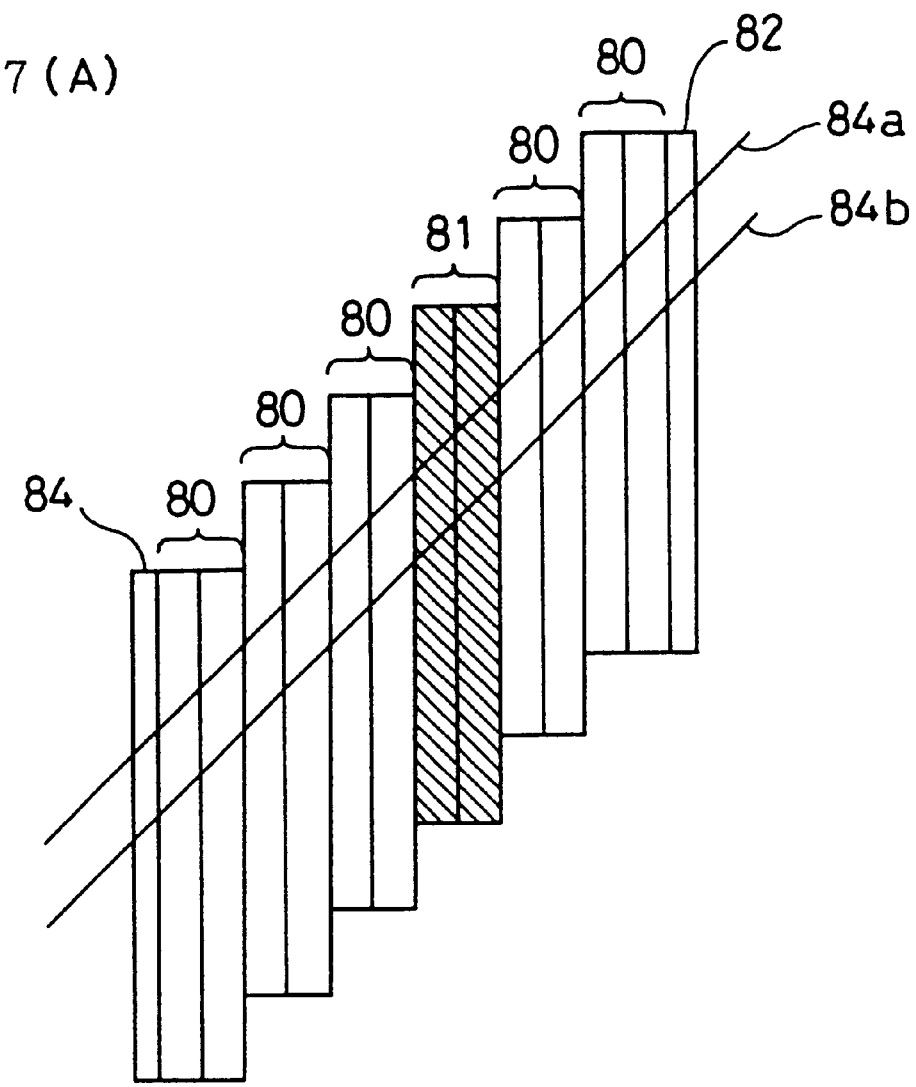
FIG. 7 shows a top view and front view of the plate glass block of FIG. 6.
Figure 7B:
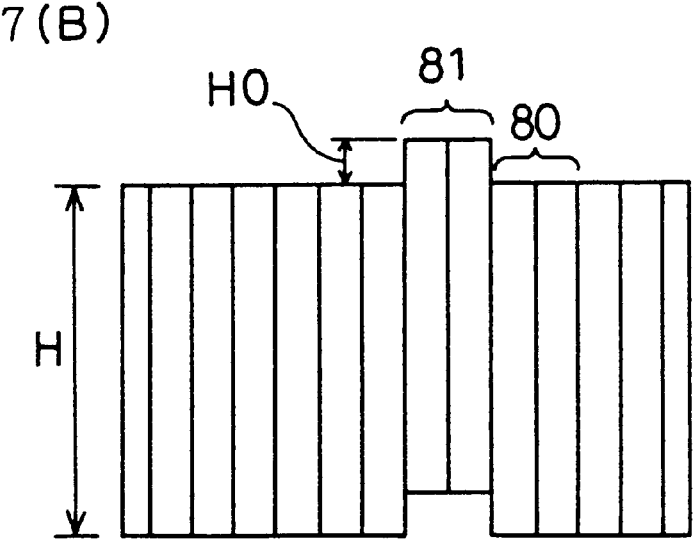

FIG. 6 is a perspective view of the plate glass block used in the manufacture of the polarization beam splitter of second preferred embodiment, while FIG. 7(A) is a plan view and FIG. 7(B) is a front view. The plate glass block shown in FIG. 6 comprises six basic structural glass bodies 80 and 81 pasted together, with pieces of dummy glass 82 and 84 pasted to both ends. Each of the basic structural glass bodies 80 and 81 has the same structure and is manufactured by the same process as the basic structural glass bodies of the first preferred embodiment shown in FIG. 1.

As is evident from FIG. 6 and FIG. 7(B), among the six basic structural glass bodies 80 and 81, the third basic structural glass body 81 from the right protrudes from the other basic structural glass bodies 80 in the height direction by an amount H0. If the height of the plate glass block is H (70 mm in this embodiment), the value of the height of protrusion H0 is preferably a value of roughly 3% of H (or roughly 2 mm in this embodiment).

As is evident from FIG. 7(B), only one basic structural glass body 81 protrudes from the upper edge surface of this glass block, forming a protrusion, and on the bottom edge surface, this basic structural glass body 81 forms a depression. Therefore, the polarization beam splitter cut from this plate glass block has an advantage in that its top and bottom can be easily identified based on the protrusion and depression.

The hatching on the top surface of the basic structural glass body 81 that protrudes upward in FIG. 6 and FIG. 7(A) is used only to make the drawing easier to read. There is actually no need to apply any special color in order to distinguish it from the other basic structural glass bodies.

By cutting this plate glass block along the cutting planes 84a and 84b, a substrate block (transparent block) that can be used as one polarization beam splitter can be cut out.

Figure 9:
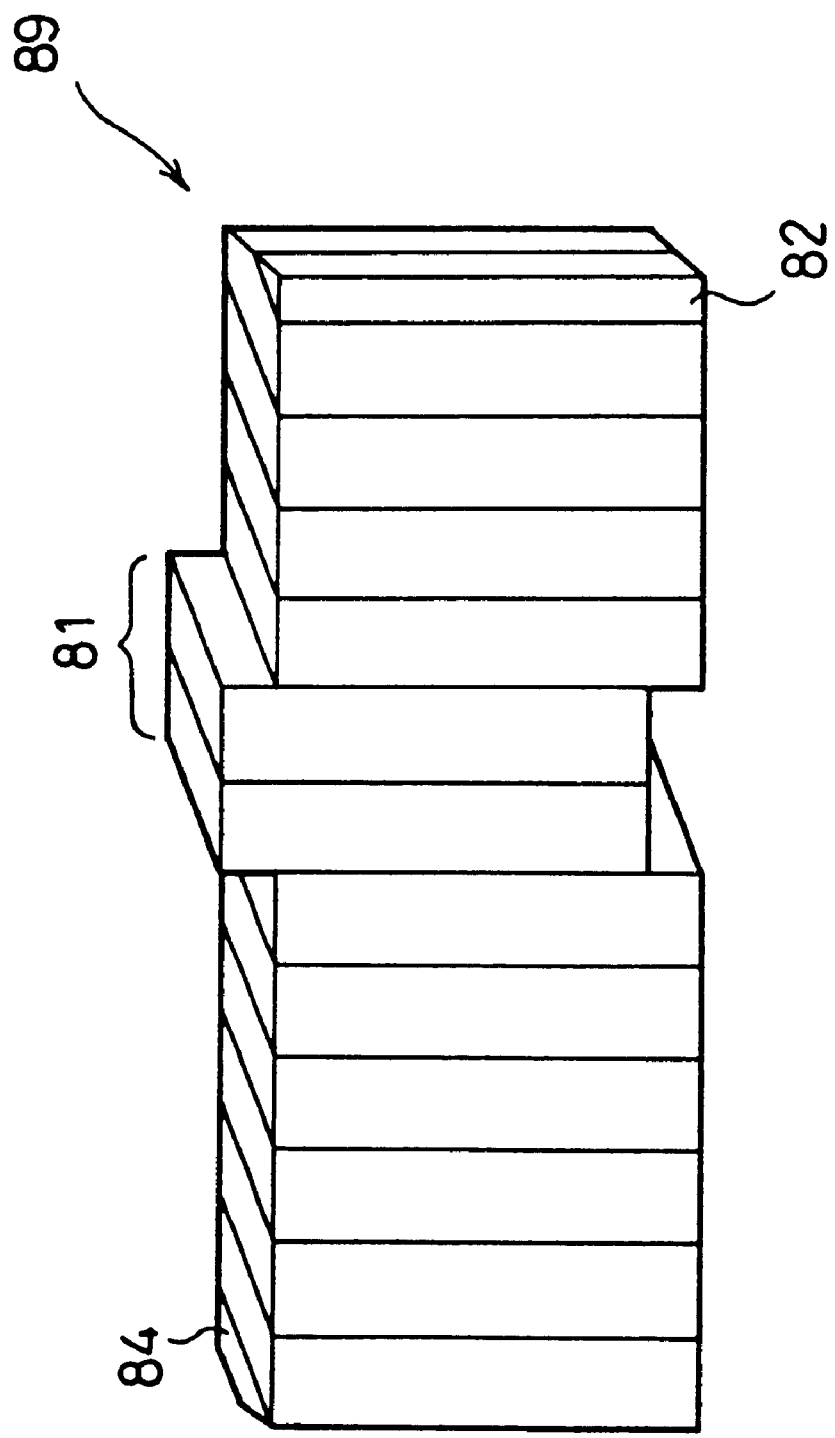
FIG. 9 is perspective view of the polarization beam splitter of the second preferred embodiment.

FIG. 8 is an explanatory diagram illustrating the process of manufacturing a polarized light separation device for use in LCD projectors from a substrate block cut along the cutting planes 84a and 84b of FIG. 7(A). First, as shown in FIG. 8(A), both ends of the cut-out substrate block are cut roughly perpendicular the light exit surface 86, to obtain a polarization beam splitter 89 which is a rough rectangular parallelepiped in shape (FIG. 8(B)). At this time, portions of the pieces of dummy glass 82 and 84 are cut, leaving a state in which some remains on the side of the light exit surface 86. In FIG. 8, the polarized light separation films 87 are drawn with solid lines, while the reflective films 88 are drawn with broken lines. The light entry surface 85 and light exit surface 86 of the cut polarization beam splitter 89 are each polished to a flat surface. FIG. 9 is a perspective view of the polarization beam splitter 89 formed in this manner.

In the cutting of FIG. 8(A), in order for the dimensions of the polarization beam splitter 89 to end up as the predetermined set values, high-precision cutting is preferable. At this time, the projection (protuberance) of basic structural glass body 81 protruding upward can be used as the reference position for determining the cutting plane. For example, as shown in FIG. 8(A), the right edge of the projection can be used as the reference from which the distances L1 and L2 are measured to the left and right for cutting. In this manner, the dimensions of these two distances can be matched to the set values to a high precision.

The boundary surface between the protruding basic structural glass body 81 and the basic structural glass body 80 immediately on its left is positioned roughly in the center longitudinally of the polarization beam splitter 89. Therefore, by making the cuts using this protrusion as the reference, it is possible to make the cuts precisely so that the boundary surface between these basic structural glass bodies 80 and 81 is positioned at the predetermined position in the center of the polarization beam splitter 89.

However, since the intensity of illumination of an ordinary light source is greatest at its center, the light flux passing through the center of the polarization beam splitter 89 is greatest. Therefore, the positional accuracy of the polarized light separation films and reflective films at the center of the polarization beam splitter has a large effect on the efficiency of conversion of the polarization beam splitter. Therefore, cutting both ends of the polarization beam splitter using the protrusion roughly in the center as the reference can increase the positional accuracy of the polarized light separation films and reflective films at the center of the polarization beam splitter and raise the efficiency of conversion of the polarization beam splitter.

In the step of FIG. 8(B), a selective phase plate 380 is pasted to the light exit surface 86 side of the polarization beam splitter 89. The selective phase plate 380 is a plate-shaped body consisting of $\lambda/2$ phase layers 381 arranged alternately with clear, transparent portions upon the light exit surfaces of the multiple glass plates making up the polarization beam splitter 89.

In the step of FIG. 8(C), a focusing lens array 310 is pasted to the light entry surface 85 side of the polarization beam splitter 89. The focusing lens array 310 comprises an array of many roughly rectangular focusing lenses 311 arranged in matrix fashion. The focusing lens array 310 is also provided with a protrusion 313 (the portion indicated by hatching). At the time that the polarization beam splitter 89 is pasted to the focusing lens array 310, a pasting jig (not shown) is provided with indentations that match the protrusions on the polarization beam splitter 89 and focusing lens array 310, so that the protrusion on the polarization beam splitter 89 and the protrusion on the focusing lens array 310 are fit into their respective indentations. By doing so, the position of the polarization beam splitter 89 and focusing lens array 310 with respect to each other can be determined to high accuracy.

As described in FIG. 8(A), the polarization beam splitter 89 is cut out to high dimensional accuracy using the protrusion on the top or the indentation on the bottom as the reference. In this manner, the dimensional accuracy of the polarization beam splitter 89 itself is high, so at the time of pasting to the focusing lens array 310, the outside shape (dimensions and shape not including the protrusion) of the polarization beam splitter 89 can be used as the reference for the positioning of the focusing lens array 310 and other constituent elements.

In this manner, by offsetting at least one of the multiple basic structural glass bodies that make up the polarization beam splitter 89 so that it protrudes from the other basic structural glass bodies, the dimensional accuracy of the polarization beam splitter 89 can be increased. In addition, the positioning accuracy of the polarization beam splitter 89 can be increased when the polarization beam splitter 89 is combined with other polarized light separation device or other equipment.

C. Third Preferred Embodiment

Figure 10:
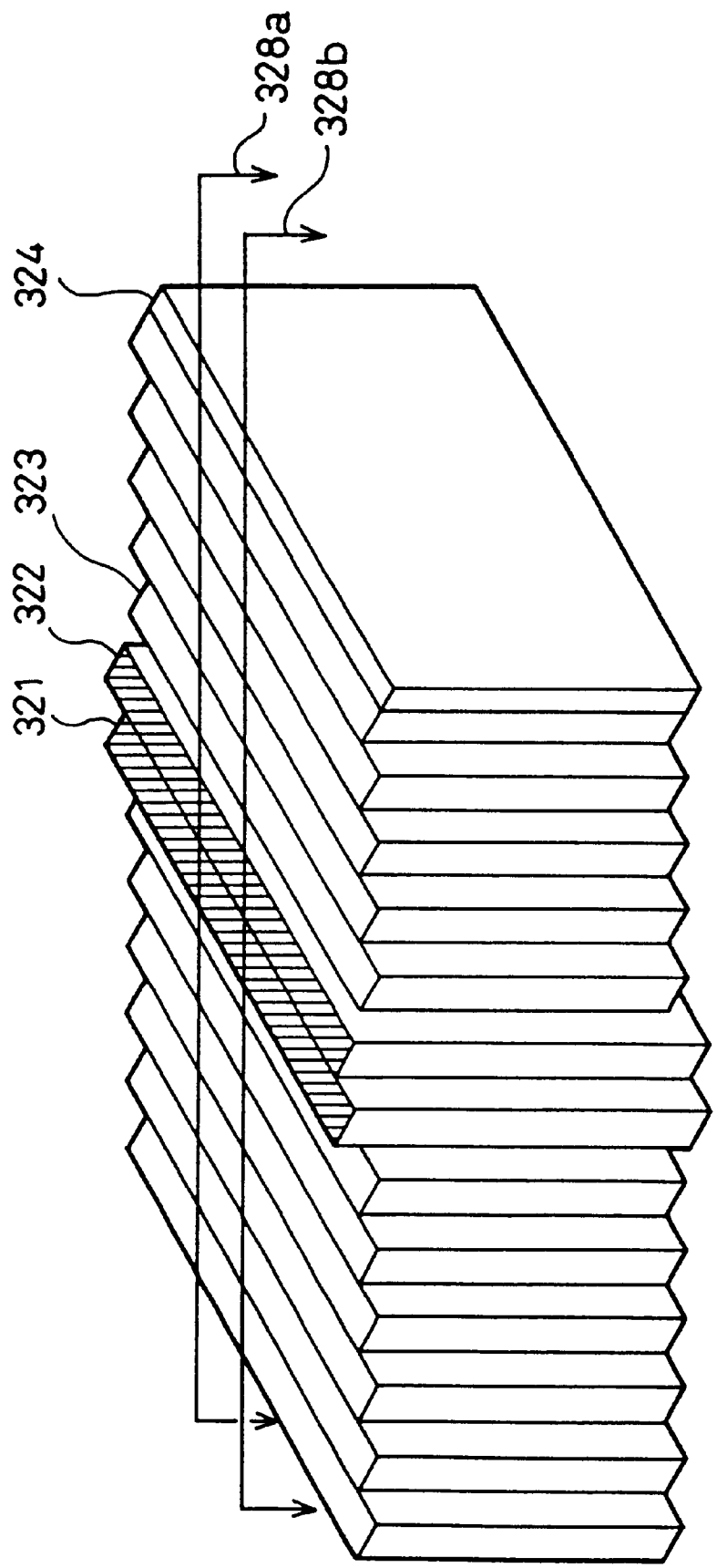
FIG. 10 is a perspective view showing the method of manufacturing the polarization beam splitter of a third preferred embodiment.
Figure 11A:
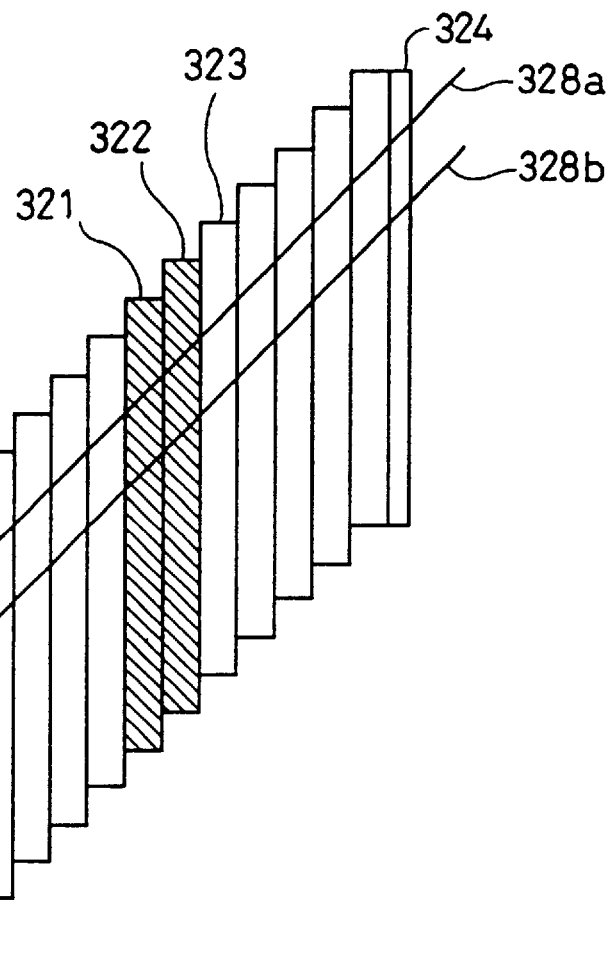
FIG. 11 shows a top view and front view of the plate glass block of FIG. 7.
Figure 11B:
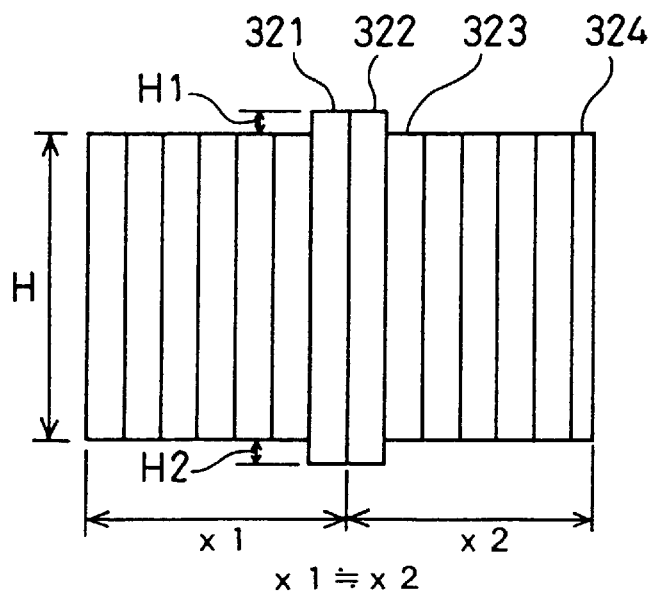

FIG. 10 is a perspective view of a third embodiment of the method of manufacturing the polarization beam splitter of the present invention, while FIG. 11(A) is a plan view and FIG. 11(B) is a front view. As is evident from FIG. 10 and FIG. 11(B), among the multiple glass plates that make up this plate glass block, two glass plates 321 and 322 roughly in the center are taller than the other glass plates 323 and protrude both up and down. In addition, a piece of dummy glass 324 is adhered to the right side of the plate glass block. No dummy glass is provided on the left side of the plate glass block. Note that in this preferred embodiment, in contrast to the aforementioned first and second embodiments, the basic structural glass bodies are unnecessary. By not using the basic structural glass bodies 80 but rather offsetting the glass plates one-by-one, the glass waste at the time that the polarization beam splitter is cut out of the substrate block can be reduced.

The hatching on the top surfaces of the two glass plates 321 and 322 in FIG. 10 and FIG. 11(A) is used only to make the drawing easier to read. There is actually no need to apply any special color in order to distinguish them from the other glass plates 323.

As shown in FIG. 11(B), the boundary surface (interface) between the two glass plates 321 and 322 is positioned roughly in the center longitudinally of the plate glass block. The height of protrusion of these plates above the plate glass block Hi and the height of protrusion below H2 may be set to values equal to each other or may be set to different values. If the height of the plate glass block is H (70 mm in this embodiment), the value of these heights of protrusion H1 and H2 are preferably a value of roughly 3% of H (or roughly 2 mm in this embodiment). If these heights of protrusion H1 and H2 are set to different values, this has the advantage in that the up and down directions of the polarization beam splitter when cut from this plate glass block are easily determined.

By cutting this plate glass block along the cutting planes 328a and 328b, a substrate block that can be used as one polarization beam splitter can be cut out.

Figure 13:
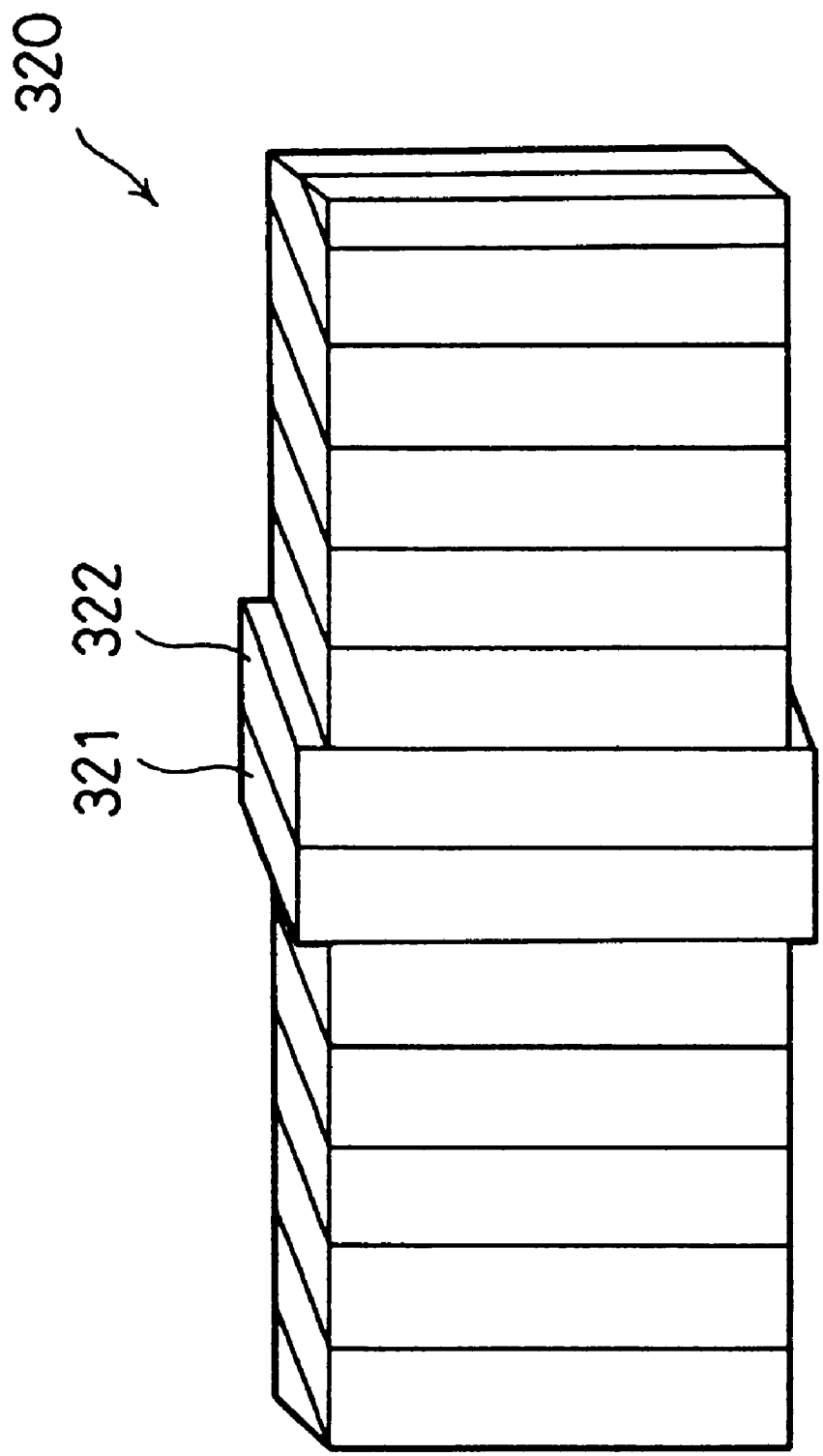
FIG. 13 is perspective view of the polarization beam splitter of the third preferred embodiment.

FIG. 12 is an explanatory diagram illustrating the process of manufacturing a polarized light separation device for use in LCD projectors from a substrate block (substrate block) cut along the cutting planes 328a and 328b of FIG. 11(B). First, as shown in FIG. 12(A), both ends of the cut-out substrate block are cut roughly perpendicular the light entry surface 327 and light exit surface 326, to obtain a polarization beam splitter 320 which is a rough rectangular parallelepiped in shape (FIG. 12(B)). At this time, portions of the piece of dummy glass 324 are cut, leaving a state in which some remains on the side of the light exit surface 326. In FIG. 12, the polarized light separation films 331 are drawn with solid lines, while the reflective films 332 are drawn with broken lines. The light entry surface 327 and light exit surface 326 of the cut polarization beam splitter 320 are each polished to a flat surface. FIG. 13 is a perspective view of the polarization beam splitter 320 formed in this manner.

In the cutting of FIG. 12(A), in order for the dimensions of the polarization beam splitter 320 to end up as the predetermined set values, high-precision cutting is preferable. At this time, the projections (protuberances) of the glass plates 321 and 322 protruding upward and downward can be used as the reference position for determining the cutting plane. For example, as shown in FIG. 12(A), the right edge of the projection can be used as the reference from which the distances W1 and W2 are measured to the left and right for cutting. In this manner, the dimensions of these two distances can be matched to the set values to a high precision.

As described above, the protruding glass plates 321 and 322 are positioned roughly in the center longitudinally of the polarization beam splitter 320. Therefore, by making the cuts using this protrusion as the reference, it is possible to make the cuts precisely so that the boundary surface between these glass plates 321 and 322 is positioned at the predetermined position in the center of the polarization beam splitter 320.

However, as described before, since the intensity of illumination of an ordinary light source is greatest at its center, the light flux passing through the center of the polarization beam splitter 320 is greatest. Therefore, the positional accuracy of the polarized light separation films and reflective films at the center of the polarization beam splitter has a large effect on the efficiency of conversion of the polarization beam splitter. Therefore, as described above, cutting both ends of the polarization beam splitter using the protrusion roughly in the center as the reference can increase the positional accuracy of the polarized light separation films and reflective films at the center of the polarization beam splitter and raise the efficiency of conversion of the polarization beam splitter.

In the step of FIG. 12(B), a selective phase plate 380 is pasted to the light exit surface side of the polarization beam splitter 320. The selective phase plate 380 is a plate-shaped body consisting of $\lambda/2$ phase layers 381 arranged alternately with clear, transparent portions upon the light exit surfaces of the multiple glass plates making up the polarization beam splitter 320.

In the step of FIG. 12(C), a focusing lens array 310 is pasted to the surface of the light entry side of the polarization beam splitter 320. The focusing lens array 310 comprises an array of many roughly rectangular focusing lenses 311 arranged in matrix fashion. The focusing lens array 310 is also provided with a protrusion 313 (the portion indicated by hatching). At the time that the polarization beam splitter 320 is pasted to the focusing lens array 310, a pasting jig (not shown) is provided with indentations that match the protrusions on the polarization beam splitter 320 and focusing lens array 310, so that the protrusion on the polarization beam splitter and the protrusion on the focusing lens array 310 are fit into their respective indentations. By doing so, the position of the polarization beam splitter 320 and focusing lens array 310 with respect to each other can be determined to high accuracy.

As described in FIG. 12(A), the polarization beam splitter 320 is cut out to high dimensional accuracy using the protrusions in the center as the reference. To wit, the dimensional accuracy of the polarization beam splitter 320 itself is high, so at the time of pasting to the focusing lens array 310, the outside shape (dimensions and shape not including the protrusion) of the polarization beam splitter 320 is usable as the reference for the positioning of the focusing lens array 310 and other constituent elements.

Figure 14:
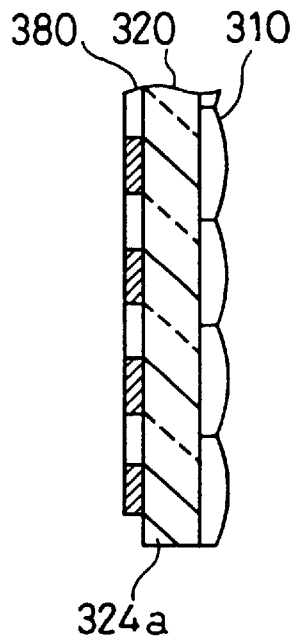
FIG. 14 is an explanatory diagram showing the effect of dummy glass 324.
Figure 14:
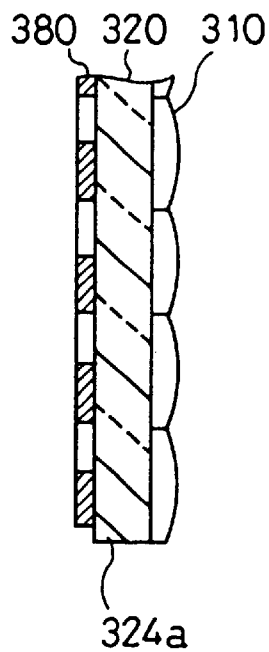
Figure 14:
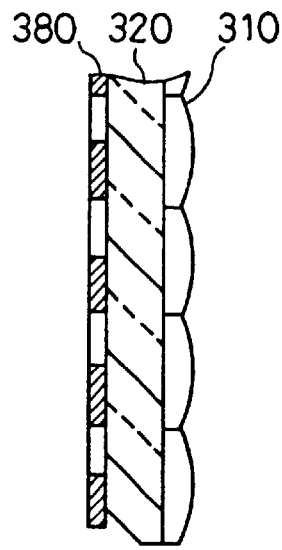

As described below, the dummy glass 324 provided on the end of the polarization beam splitter 320 has the effect of preventing the selective phase plate 380 from coming off. FIG. 14 is an explanatory diagram showing the effect of the dummy glass 324. FIG. 14(A) shows the selective phase plate 380 when attached in the correct position, while FIGS. 14(B) and (C) show the selective phase plate 380 offset somewhat in the downward direction from the state shown in FIG. 14(A). However, in the structure of FIG. 14(B), the dummy glass 324a is provided on the lower edge. FIG. 14(C) shows the case in which the dummy glass is omitted. If there is no dummy glass as in FIG. 14(C), in the event that the selective phase plate 380 is offset from its correct position, the end of the selective phase plate 380 protrudes from the end of the polarization beam splitter 320. As a result, the selective phase plate 380 may come off easily. In contrast, when dummy glass 324a is provided on the end of the polarization beam splitter 320 as in FIG. 13(B), the end of the selective phase plate 380 rides upon the dummy glass 324*a*. Therefore, this has the advantage in that the selective phase plate 380 does not come off easily.

In this manner, by causing several glass plates to protrude on two side surfaces formed roughly perpendicular to the planes of the polarized light separation films and reflective films (namely, the interfaces between multiple glass plates) among the four side surfaces adjacent to the polarized light separation surfaces and reflective surfaces of the polarization beam splitter 320, the dimensional accuracy of the polarization beam splitter 320 can be increased. In addition, the positioning accuracy of the polarization beam splitter 320 can be increased when the polarization beam splitter 320 is combined with other polarized light separation device or other equipment.

The protruding portions are not limited to one place, but rather they can protrude at several places. In addition, the number of glass plates that protrude at one place is not limited to 2, but rather any number of glass plates can be made to protrude.

Other types of position-identifying parts (markers) that are usable at the time of the positioning of the polarization beam splitter may also be provided instead of the protrusions described above. Conceivable position-identifying parts include indentations, glass portions marked at their ends with colors different than those of other portions, glass portions stamped with special markings or the like. Note that stamped markings can also be considered to be indentations in the broad sense.

Note that blue float glass can be used for the two types of glass plates 321 and 322. In this case, the flatness of the surface of float glass is high, so no polishing of the surface is necessary. In addition, by using blue plate glass for one of the two types of glass plates 321 and 322 and white plate glass for the other, the positions of the polarized light separation films 331 and reflective films 332 can be easily identified.

D. Fourth Preferred Embodiment

Figure 15:
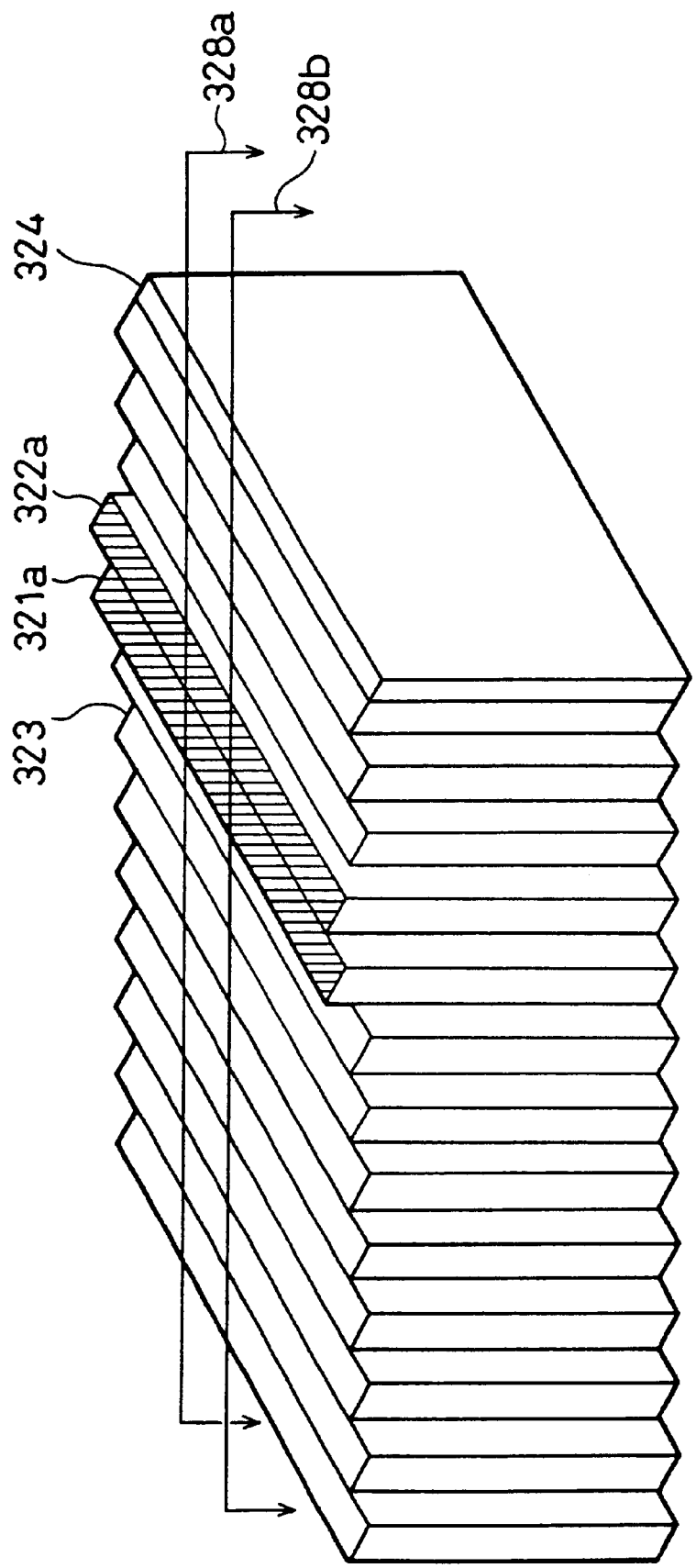
FIG. 15 is a perspective view showing the method of manufacturing the polarization beam splitter of a fourth preferred embodiment.
Figure 16A:
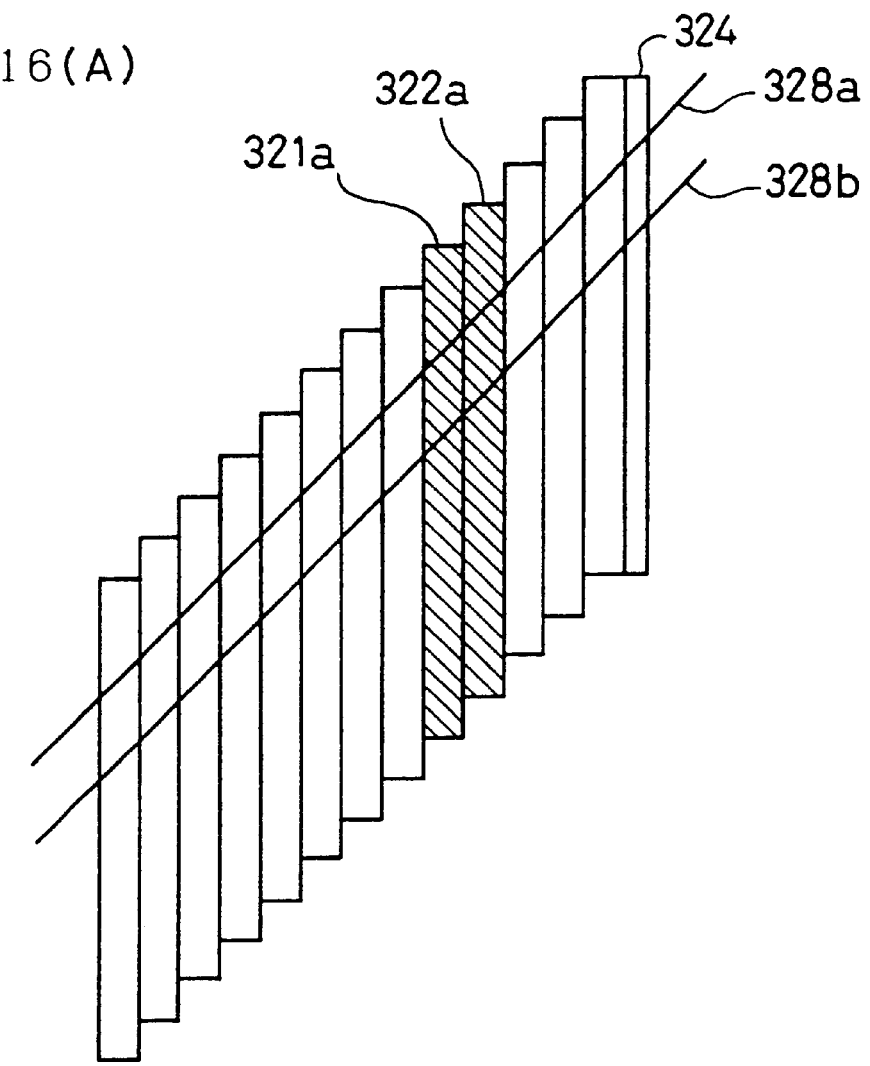
FIG. 16 shows a top view and front view of the plate glass block of FIG. 15.
Figure 16B:
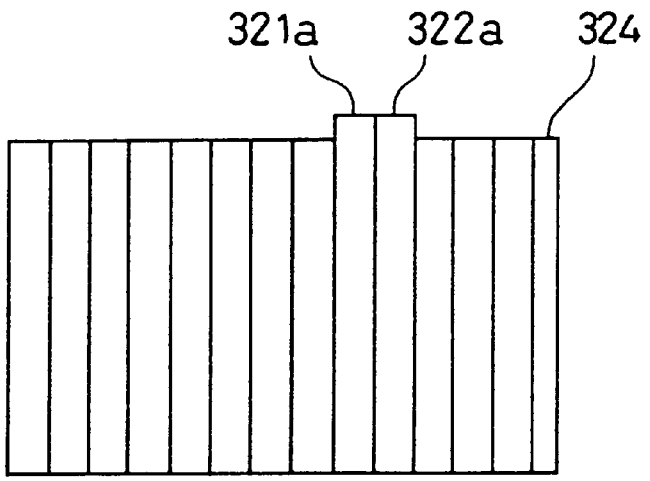
Figure 17:
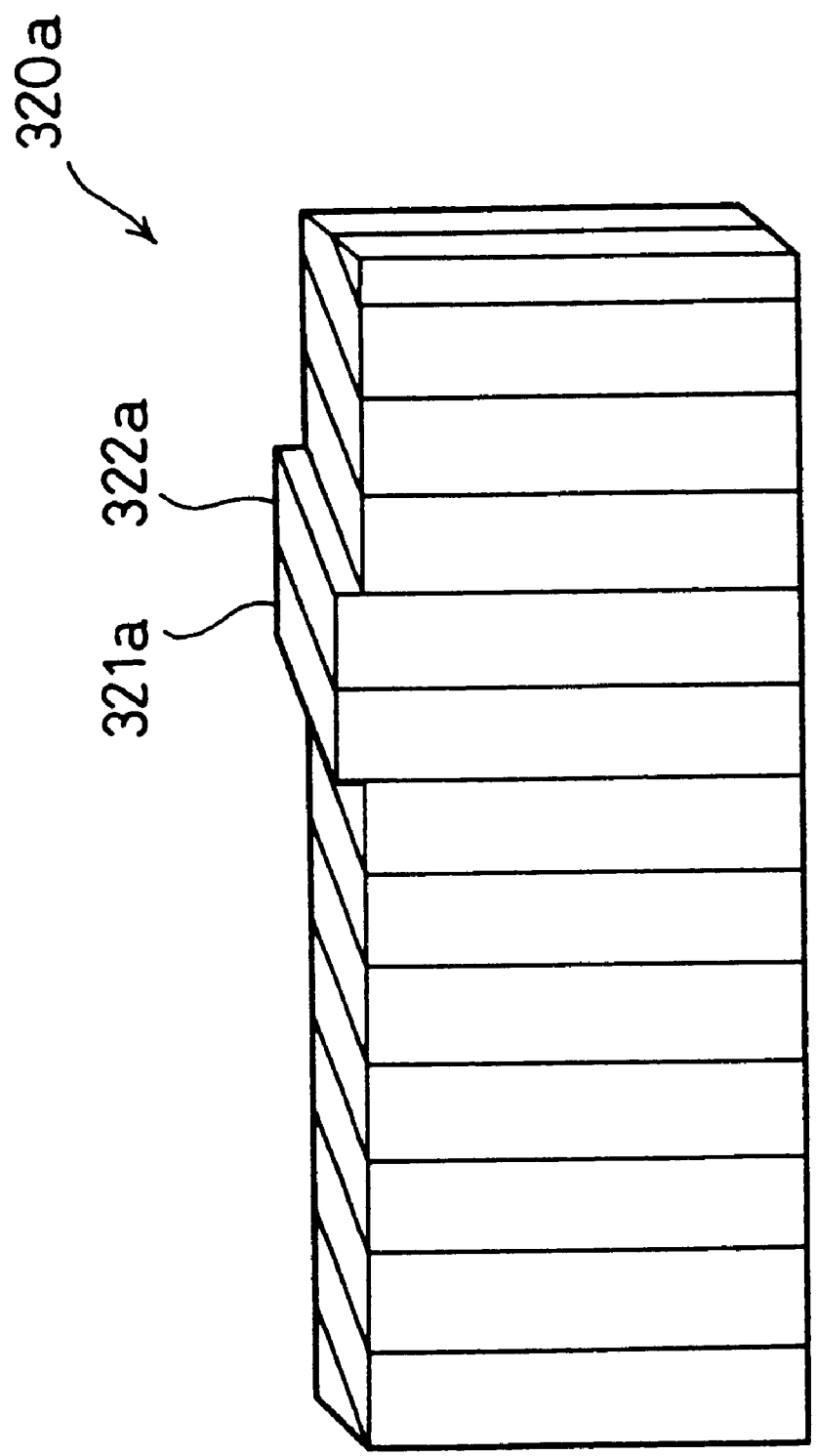
FIG. 17 is a perspective view of the polarization beam splitter of the fourth preferred embodiment.

FIG. 15 is a perspective view of a fourth embodiment of the method of manufacturing the polarization beam splitter of the present invention, while FIG. 16(A) is a plan view and FIG. 16(B) is a front view. FIG. 17 is a perspective view of the polarization beam splitter 320*a* formed by cutting along the cutting planes 328*a* and 328*b* of FIG. 16(A) and then both of its ends being cut off in the same manner as FIG. 12(A). As is evident from FIG. 15 and FIG. 16(B), among the multiple glass plates that make up this plate glass block, two glass plates 321*a* and 322*a* protrude above the other glass plates 323. However, in contrast to the third preferred embodiment, these glass plates 321*a* and 322*a* do not protrude below, as their bottom surfaces are formed in the same plane as the bottom surface of the other glass plates 323. In other words, in the polarization beam splitter cut from this plate glass block, the glass plates protrude from one of the side surfaces among the two side surfaces roughly orthogonal to the planes of the polarized light separation films and reflective films. Since a protrusion is provided on only one side, this has the advantage in that the top and bottom of the polarization beam splitter can be easily distinguished.

In addition, the fact that these two glass plates 321*a* and 322*a* are positioned not at the center but toward one side is also different from the third preferred embodiment. Since the protrusion is moved from the center longitudinally, this also has the advantage of permitting the light entry surface and light exit surface to be distinguished by means of the protrusion. Note that the amount by which the protrusion is moved from the center longitudinally is preferably roughly two glass plates.

If the light entry surface and light exit surface of the polarization beam splitter are inadvertently interchanged, the following trouble will occur. FIG. 18 is an explanatory diagram showing the trouble that occurs when the light entry surface and reflection surface are inadvertently interchanged. FIG. 18(A) shows the function of the polarization beam splitter alone. When randomly polarized light enters the polarization beam splitter, the p-polarized components and s-polarized components are first separated by the polarized light separation film 331. For example, the p-polarized components pass through the polarized light separation film 331 without modification, but the s-polarized components are reflected roughly at a right angle. The s-polarized components are reflected by the reflective film 332 and exit.

FIG. 18(B) illustrates a polarized light conversion element formed by pasting a selective phase plate 380 to the light exit surface of this polarization beam splitter 320 and also providing a light-blocking plate 340 in front of the light entry surface side, so that P-polarized light is obtained from randomly polarized light. This light-blocking plate 340 is formed of alternating light-blocking portions 341 that block out light and light-transparent portions 342 that are transparent to light. Therefore, the light-blocking plate 340 has the function of controlling the fluxes of light that pass through depending on the position on the light-blocking plate 340. However, when this polarization beam splitter 320 is used to form a so-called integrator optical system, a lens plate consisting of a plurality of small lenses arranged in matrix fashion is arranged on the light entry side of the polarization beam splitter 320, and focusing lenses are arranged on the light exit side. The method of arrangement of the light-blocking portions 341 and light-transparent portions 342 is set such that the focused light images from these small lenses are formed only on the polarized light separation surfaces of the polarization beam splitter 320. Objects that are usable as the light-blocking plate 340 include a plate-shaped transparent body (e.g., a glass plate) upon which a light-blocking film (e.g., a chromium film or aluminum film) is partially formed as in this embodiment, or a light-blocking flat plate such as an aluminum plate, for example, in which holes are provided. When the light-blocking surface is formed using a light-blocking film in particular, the same function can be achieved by forming a light-blocking film directly upon the focusing lens array or polarization beam splitter 320.

The light that passes through the light-transparent portions 342 is separated into the p-polarized components and the s-polarized components by the polarized light separation film 331. The p-polarized components pass through the polarized light separation film 331 without modification. On the other hand, the s-polarized components are reflected by the reflective film 332 and then converted to p-polarized components by the λ/2 phase plate 381 and exit. Therefore, only P-polarized light exits from this polarized light conversion element.

FIG. 18(C) shows the state in which the front and back of the polarization beam splitter 320 are reversed. The light-blocking plate 340 is positioned at the position at which the illumination of emitted light is a maximum. When the front and back of the polarization beam splitter 320 are reversed as in FIG. 18(C), the trouble is that the polarized light components of the emitted light are reversed. This becomes a problem when the polarization beam splitter is assembled into a projection display device (FIG. 20) to be described later. Specifically, in the projection display device shown in FIG. 20, the polarization beam splitter is combined with the λ/2 phase plate for the purpose of converting the light from a light source 100 into a single type of polarized light (P-polarized light or S-polarized light). On the other hand, in order to improve contrast, polarizing plates that selectively permit only either P-polarized light or S-polarized light to pass through are normally formed on the side of the light entry surface of the LCD panels 803, 805 and 811 provided as means of modulating the light exiting from the optical element 300 equipped with a polarization beam splitter and λ/2 phase plate. Therefore, if the polarized light components of the emitted light are reversed, the light will be absorbed by the polarizing plates formed on the side of the light entry surface of the LCD panels 803, 805 and 811, so there is a risk that it will not function as a projection display apparatus.

In addition, in the case of FIG. 18(C) the number of times that light passes through the adhesive layers 325 from entry to exit increases in comparison to FIG. 18(B). Since the adhesive layers 325 absorb light, there is a problem in that the efficiency of the polarized light conversion element is decreased.

In this manner, if the front and back of the polarization beam splitter are reversed, there is the possibility of various problems occurring. To solve this problem, by adopting the methods shown in FIG. 15 and FIG. 16 and forming a polarization beam splitter that has projections (position-identifying parts) on one side and at a position offset from the center, this has an advantage in that its front and back can be easily distinguished, so these kinds of problems can be prevented. In addition, in the fourth preferred embodiment, by providing a projection, the dimensional accuracy of the polarization beam splitter is increased, so it has the same sort of advantage as in the third preferred embodiment. Moreover, it also has the advantage in that the positioning accuracy of the polarization beam splitter can be increased when the polarization beam splitter is combined with other polarized light separation device or other equipment.

FIG. 19 is a schematic structural diagram showing a plan view of the important portions of a polarized light illumination apparatus 500 having an array of beam splitters based on this preferred embodiment. This polarized light illumination apparatus 500 comprises a light source 100 and a polarized light generation apparatus 400. The light source 100 generates a flux of randomly polarized light containing s-polarized components and p-polarized components. The light flux exiting the light source 100 is converted by the polarized light generation apparatus 400 into one type of linearly polarized light with roughly uniform directions of polarization, which illuminates an illuminated region 90.

The light source 100 comprises a light source lamp 101 and parabolic reflector 102. The light emitted from the light source lamp 101 is reflected by the parabolic reflector 102 toward one direction, forming a roughly parallel light flux which enters the polarized light generation apparatus 400. The light source optic axis R is shifted in the X direction from the system optic axis L by a fixed distance D. Here, the system optic axis L is the optic axis of the polarization beam splitter array 320. The reason for shifting the light source optic axis R will be described later.

The polarized light generation apparatus 400 comprises a first optical element 200 and a second optical element 300. The first optical element 200 has a structure comprising a plurality of small light flux dividing lenses 201 arranged vertically and horizontally. The first optical element 200 is arranged such that the light source optic axis R is aligned with the center of the first optical element 200. The external shape of the individual light flux dividing lenses 201 when viewed from the Z direction is set to form a shape similar to that of the illuminated region 90. In this preferred embodiment, an illuminated region 90 that is oblong in the X direction is envisioned, so the external shape of the light flux dividing lenses 201 in the XY plane is also oblong.

The second optical element 300 comprises a focusing lens array 310, polarization beam splitter array 320, selective phase plate 380 and exit-side lens 390. The focusing lens array 310 has a structure roughly similar to that of the first optical element 200. To wit, the focusing lens array 310 has the same number of focusing lenses 311 as the light flux dividing lenses 201 that make up the first optical element 200, arranged in matrix fashion. The focusing lens array 310 is also positioned such that its center is aligned with the light source optic axis R.

The light source 100 emits a flux of roughly parallel white light with random directions of polarization. The light flux emitted from the light source 100 and entering the first optical element 200 is divided into intermediate light fluxes 202 by the individual light flux dividing lenses 201. The focusing action of the light flux dividing lenses 201 and focusing lenses 311 focuses the intermediate light fluxes 202 onto planes (the XY planes in FIG. 19) which are perpendicular to the system optic axis L. At the positions at which the intermediate light fluxes 202 focus are formed the same number of images of the light source as the number of light flux dividing lenses 201. The positions at which the images of the light source are formed are near the polarized light separation films 331 within the polarization beam splitter array 320.

The reason why the light source optic axis R is shifted from the system optic axis L is so that the image of the light source is formed at the positions of the polarized light separation films 331. This shift distance D is set to ½ of the width Wp of the polarized light separation film 331 in the X direction. As described above, the centers of the light source 100, the first optical element 200 and the focusing lens array 310 are aligned with the light source optic axis R and shifted from the system optic axis L by the amount of D=Wp/2. On the other hand, the centers of the polarized light separation films 331 which separate the intermediate light fluxes 202 are also shifted from the system optic axis L by the amount of D=Wp/2. Therefore, by shifting the light source optic axis R from the system optic axis L by the amount of D=Wp/2, the image of the light source of the light source lamp 101 is formed at roughly the center of the polarized light separation film 331.

The light flux that enters the polarization beam splitter 320 is converted entirely to S-polarized light or P-polarized light. The light flux emitted from the polarization beam splitter array 320 illuminates the illuminated region 90 by means of the exit-side lens 390. The illuminated region 90 is illuminated by the large number of light fluxes divided by the large number of light flux dividing lenses 201, so the entire illuminated region 90 can be illuminated uniformly.

In the event that the degree of parallelism of the light fluxes entering the first optical element 200 is extremely good, the focusing lens array 310 may be omitted from the second optical element 300.

As described above, the polarized light illumination apparatus 500 of FIG. 19 has the function of a polarized light generator that converts white light fluxes with random directions of polarization into light fluxes with a specific direction of polarization (S-polarized light or P-polarized light), and the function of uniformly illuminating the illuminated region 90 with this large number of light fluxes of polarized light.

FIG. 20 is a schematic structural diagram showing the important portions of the projection display apparatus 800 equipped with the polarized light illumination apparatus 500 shown in FIG. 19. This projection display apparatus 800 comprises the polarized light illumination apparatus 500, dichroic mirrors 801 and 804, reflection mirrors 802, 807 and 809, lenses 806, 808 and 810, three LCD panels (LCD light valves) 803, 805 and 811, a dichroic prism 813 and a projection lens 814.

The dichroic mirrors 801 and 804 function as color separation means for separating the white light flux into colored light of the three colors red, green and blue. The three LCD panels 803, 805 and 811 function as light modulating means for separately modulating the three colors to form an image according to image information (image signals) provided. The dichroic prism 813 functions as color synthesis means for synthesizing the colored light of three colors to form a color image. The projection lens 814 functions as a projection optical system for projecting light representing the synthesized color image onto a screen 815.

The blue light/green light-reflecting dichroic mirror 801 is transparent to the red light components of the white light flux emitted from the polarized light illumination apparatus 500 while reflecting the blue light components and green light components. The red light that passes through is reflected by the reflection mirror 802 and reaches LCD panel 803. On the other hand, of the blue light and green light reflected by the first dichroic mirror 801, the green light is reflected by the green light-reflecting dichroic mirror 804 and reaches LCD panel 805. Furthermore, the blue light also passes through the dichroic mirror 804.

In this preferred embodiment, the optical path length for blue light is the longest among the three colors of light. Because of this, behind the dichroic mirror 804 is provided light guide means 850 for the blue light consisting of a relay lens system containing an entry lens 806, relay lens 808 and exit lens 810. In other words, after passing through the green light-reflecting dichroic mirror 804 the blue light first passes through the entry lens 806 and reflection mirror 807 and is led to the relay lens 808. Moreover, it is reflected by reflection mirror 809 and led to the exit lens 810 and reaches LCD panel 811. The three LCD panels 803, 805 and 811 are equivalent to the illuminated region 90 in FIG. 19.

Each of the three LCD panels 803, 805 and 811 modulates one color of light according to the image signals (image information) provided by an external control circuit (not shown), to generate colored light containing image information for each of the color components. The three colors of modulated light enter the dichroic prism 813. The dichroic prism 813 has a structure wherein a multi-layer thin-film dielectric that reflects red light and a multi-layer thin-film dielectric that reflects blue light are arranged in a cross shape. These multi-layer thin-film dielectrics synthesize the three colors of light to form light that represents a color image. The projection lens 814, which is a projection optical system, projects the synthesized light onto a screen 815 and an enlarged image is displayed.

In this projection display apparatus 800, LCD panels 803, 805 and 811 of a type that modulate a light flux of a specific direction of polarization (S-polarized light or P-polarized light) are used as the light modulation means. These LCD panels normally have polarizing plates (not shown) pasted to their light entry side and light exit side, respectively. Therefore, when the LCD panels are illuminated with a light flux having random directions of polarization, roughly half of the light flux is absorbed by the polarizing plate of the LCD panel and converted to heat. As a result, the low efficiency of utilization of light and the generation of heat by the polarizing plates become problems. However, in the projection display apparatus 800 shown in FIG. 20, the polarized light illumination apparatus 500 generates a light flux of the specific direction of polarization that passes through the LCD panels 803, 805 and 811, so the problems of absorption of light and generation of heat by the polarizing plate of the LCD panel is greatly ameliorated.

As described above, by using the polarization beam splitter array according to this preferred embodiment, the efficiency of utilization of light in the projection display apparatus can be increased. Therefore, the image projected onto the screen 815 can be made brighter.

Figure 21:
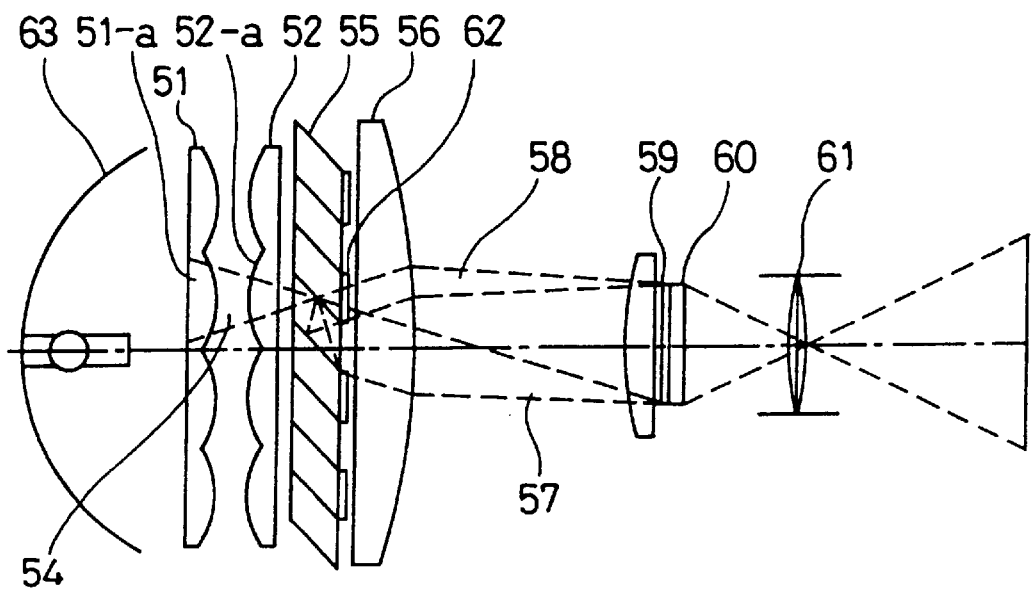
FIG. 21 is a plan view of another preferred embodiment of the projection display apparatus of the present invention.

FIG. 21 is a schematic sectional view of the structure of another example of a projection display apparatus that uses the polarized light conversion device of the present invention. Light emitted in a roughly parallel manner by the light source, a lamp 63, passes through the plurality of lenses 51-a of a first lens plate 51 and is collected in the direction of a second lens plate 52 which has the same number of lenses 52-a. The first lens plate 51 and second lens plate 52 form an integrator illumination system. In other words, the light flux from the lamp 63 is divided by the lenses 51-a and the divided light fluxes are superimposed upon a LCD panel 60 using the lenses 52-a, so uniform illumination is achieved. In addition, 55 denotes a polarization beam splitter, which is fabricated by a method, as described above, wherein glass plates coated with a polarized light separation film consisting of a multi-layer thin film of inorganic material and glass plates vapor-deposited with a reflective film of aluminum are pasted together alternately and then cut obliquely and the cut surface is polished.

Now the focused light flux 54 from the lenses 51-a is focused upon the polarized light separation film within the polarization beam splitter 55. Among the focused light flux 54 which has randomly polarized components, the P-polarized light passes through the polarized light separation film, while the S-polarized light is reflected. After being reflected by the polarized light separation film, the S-polarized light is emitted from the polarization beam splitter 55 (as the S-polarized light flux 58). On the other hand, when the P-polarized light passes through a λ/2 phase plate 62 provided selectively on the light exit surface side of the polarization beam splitter 55, the axis of polarization is rotated by 90°. In other words, the P-polarized light flux is converted into an S-polarized light flux. A condenser lens 56 is a lens intended to superimpose the light fluxes emitted from the polarization beam splitter 55 upon the LCD panel 60. The LCD panel 60 modulates the incident light flux based on image information, and the modulated image is projected upon a screen by means of a projection lens 61. By using the polarization beam splitter 55, the projection display apparatus of this embodiment changes a conventional system wherein only one of the components of polarized light emitted by the lamp is used to one wherein all of the components of light are used, so light losses are lessened and a brighter projected image can be obtained. In addition, since light losses are eliminated, and those losses conventionally result in heat being generated, this heat is not generated. Therefore, the cooling device that cools the apparatus can be made more compact or omitted, so the entire apparatus can be made smaller and more compact. In addition, the polarization beam splitter 55 is formed by being cut obliquely from a pasted block of plate glass, so it can be formed as a thin plate. In other words, a bright projection display apparatus can be formed by merely inserting the polarization beam splitter taking a very small amount of space in an integrator optical system with no polarization beam splitter.

In an integrator optical system, unevenness in the light rays of the lamp 63 can be reduced the greater the number of divisions of the lens. Here, the polarization beam splitter 55 requires a number of polarized light separation films and reflective films equal to the number of divisions of lenses in the integrator optical system but in this embodiment, the polarization beam splitter 55 is formed by pasting together glass plates so a polarization beam splitter that has a large number of polarized light separation films and reflective films corresponding to the number of divisions of lenses can be easily manufactured. This is not achievable with the conventional method of pasting together triangular prisms since there are limitations on the polishing of prisms, vapor deposition of films, pasting and the like. By using a polarization beam splitter cut obliquely from a pasted block of glass plates in a projection display apparatus equipped with an integrator optical system, the efficiency of utilization of light can be increased and a uniform image with no unevenness can be obtained.

D. Other

The present invention is in no way limited to the aforementioned examples and preferred embodiments, but rather, as long as they do not substantially depart from it, implementation in various modes is possible; for example, the following modifications are possible.

Figure 22:
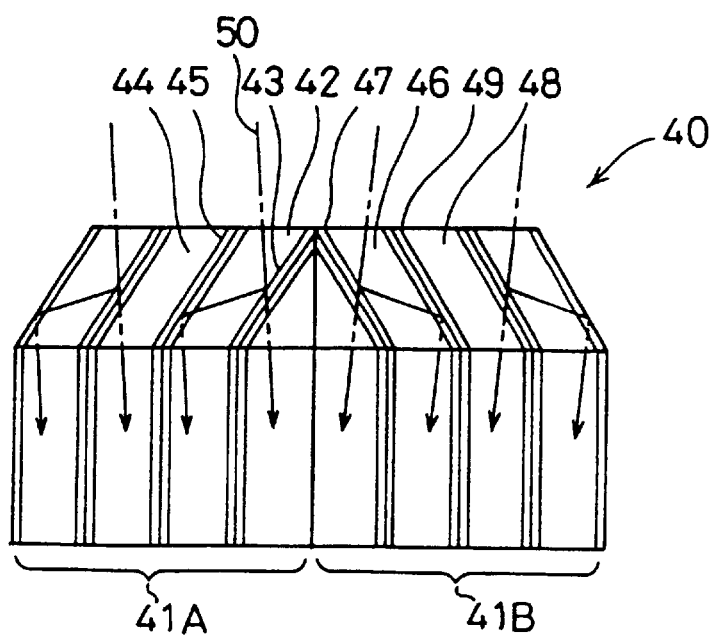
FIG. 22 is a perspective view of a preferred embodiment of the polarization beam splitter of the present invention.

FIG. 22 shows another embodiment of the polarization beam splitter of the present invention. In this embodiment, polarization beam splitters 41A and 41B are placed together such that their polarized light separation films 43 and 47 and reflective films 45 and 49 face each other to form a polarization beam splitter 40. A polarized light separation film 43 made of inorganic material is vapor-deposited upon a glass plate 42 and a reflective film 45 is vapor-deposited upon a glass plate 44. In addition, a polarized light separation film 47 made of inorganic material is vapor-deposited upon a glass plate 46 and a reflective film 49 is vapor-deposited upon a glass plate 48. After vapor deposition, the glass plates of the respective polarization beam splitters 41A and 41B are adhered together, cut,and formed into plate shape.

Figure 24:
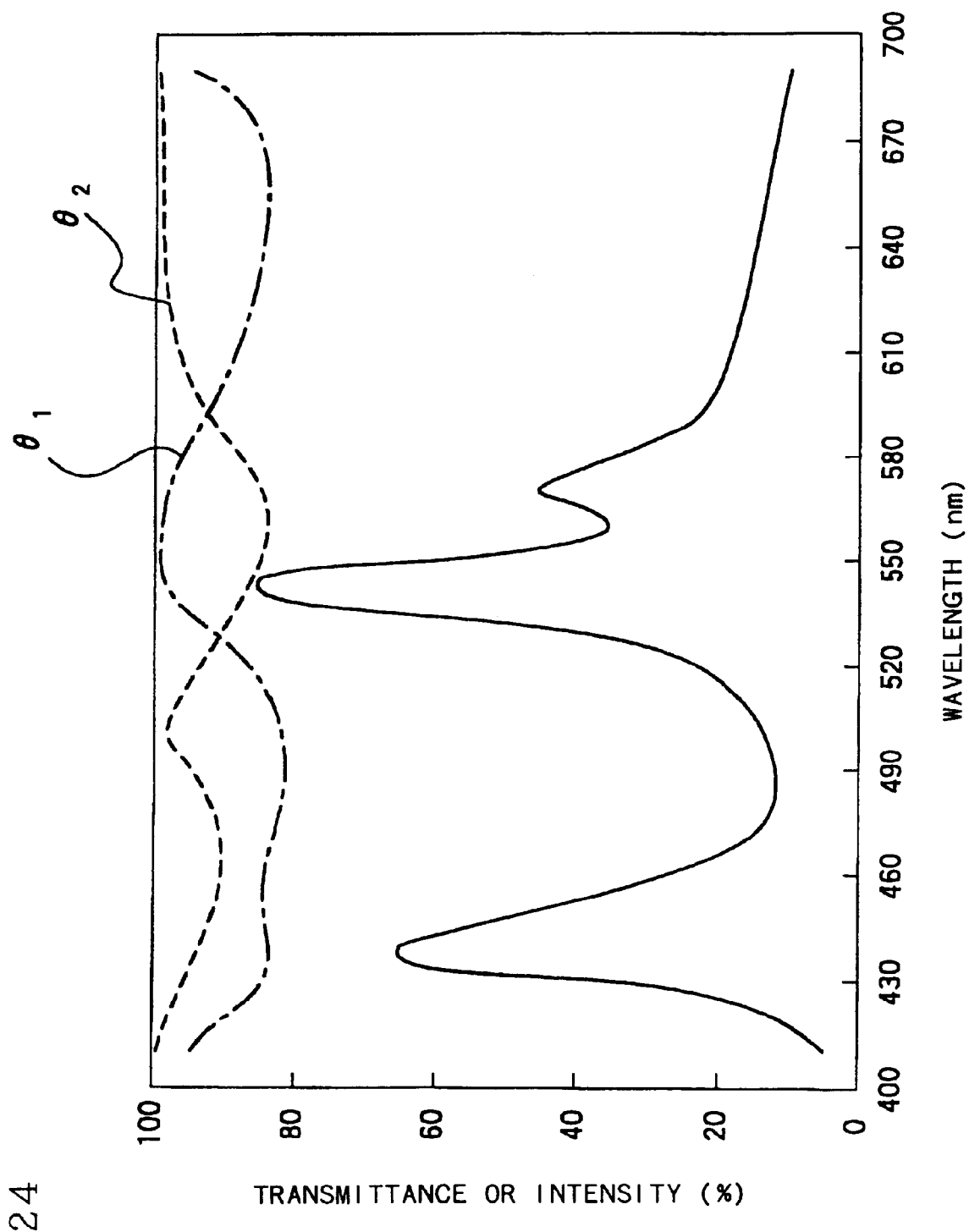
FIG. 24 is a graph of the transmittance of the polarized light separation film as a function of the spectrum and angle of incidence of incident light.

When a polarization beam splitter is used as a polarized light conversion device for an illumination apparatus having a polarized light conversion mechanism, the lamp is arranged such. that its optic axis passes roughly through the center of the polarization beam splitter. In this case, as shown in FIG. 23, the angle of the light entering the polarized light separation films 43 and 47 is not constant. On the other hand, since the polarized light separation films 43 and 47 consist of multi-layer thin films of inorganic material, if the angle of incidence of light changes, as shown in FIG. 24, the characteristics of transparency and reflection change, and left-right asymmetrical coloring of the illumination easily occurs. In FIG. 24, the solid line indicates the spectrum of light emitted by the light source, the dashed line indicates the transmittance curve for light at an angle of incidence of $\theta_1$ and the alternate long and short dashed line indicates the transmittance curve for light at an angle of incidence of $\theta_2$. Thus, if the polarized light separation films 43 and 47 and reflective films 45 and 49 are arranged such that they face each other with left-right symmetry as in the polarization beam splitter 40 of this embodiment, it is possible to make this kind of angular dependence of the multi-layer thin films offset each other left and right. Therefore, it is possible to achieve uniform illumination over the entire illuminated region. By adopting such a polarized light conversion device in a projection display apparatus that projects a color image, a good image with little color unevenness can be obtained.

Figure 25:
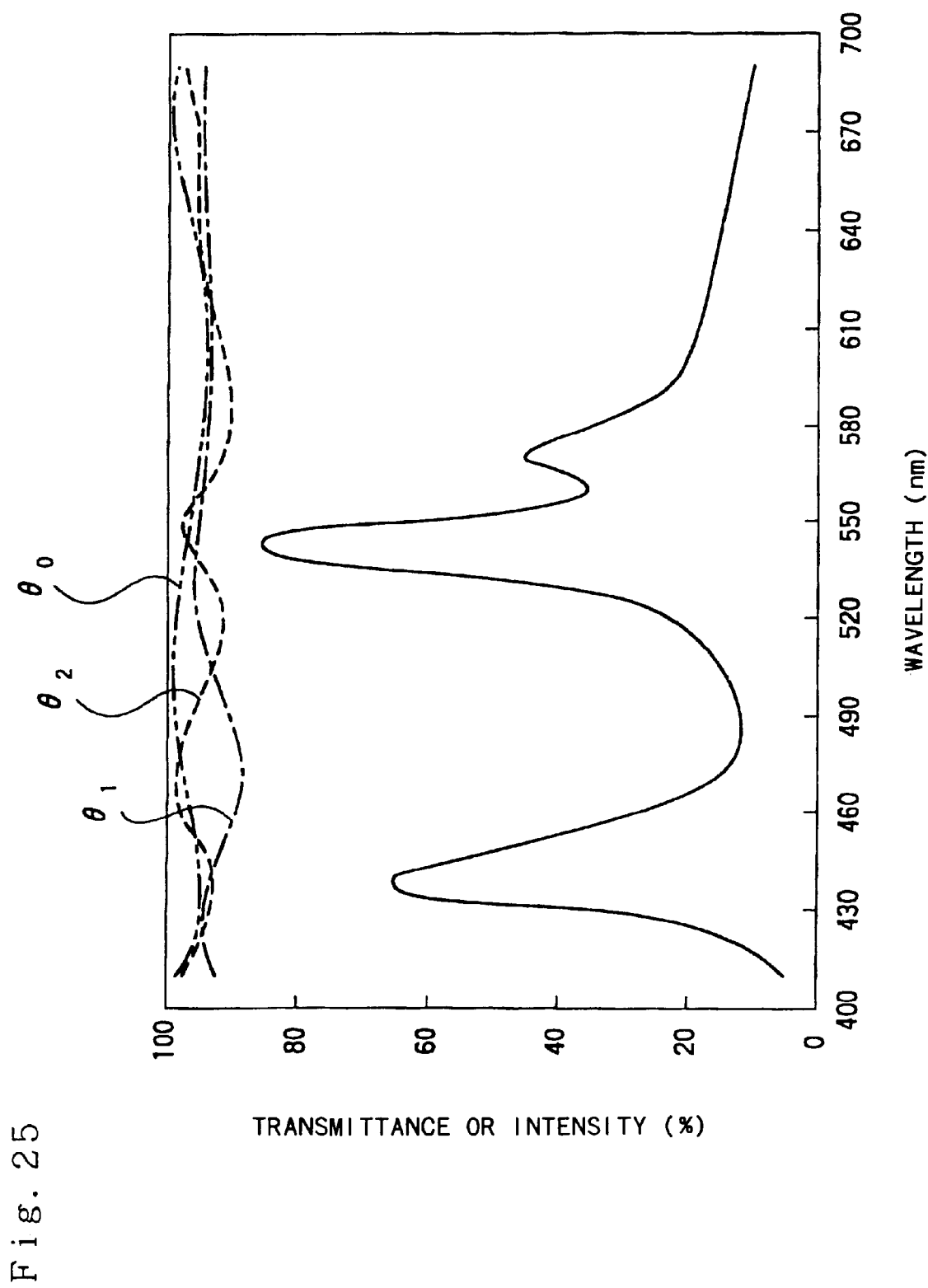
FIG. 25 is a graph of the transmittance of another polarized light separation film as a function of the spectrum and angle of incidence.
Figure 26:
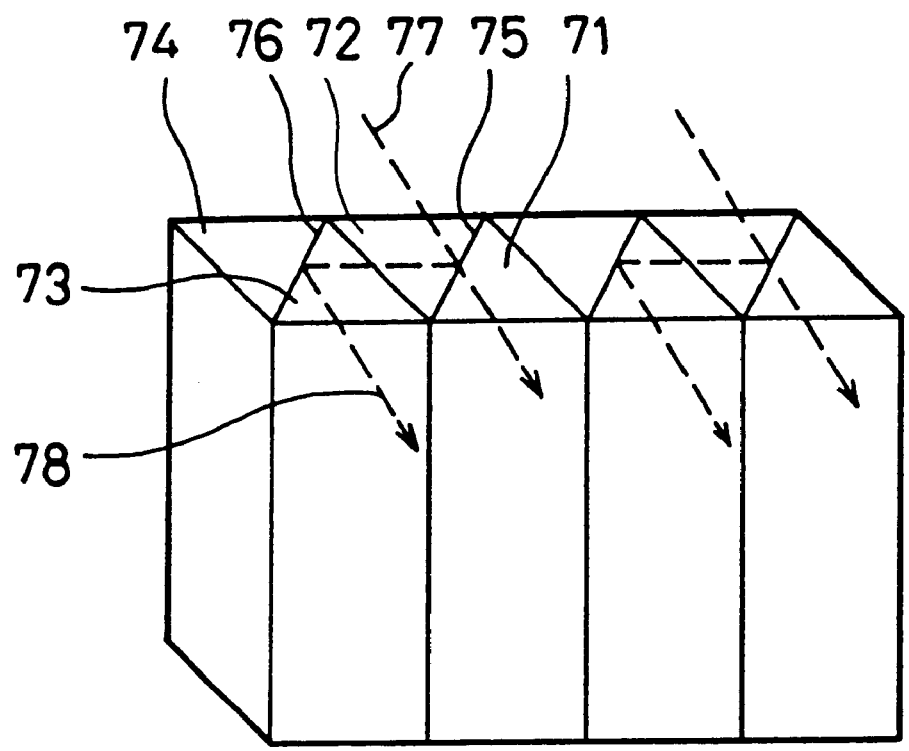
FIG. 26 is a perspective view showing a conventional polarization beam splitter.

Moreover, in order to correct this coloring, the following method can be adopted. FIG. 25 shows the transmittance characteristic based on differences in the angle of incidence of light of a wavelength corresponding to the peaks at various colors. In this embodiment, $\theta_0$ is 45°, $\theta_1$ is 50° and $\theta_2$ is 40°. The polarized light separation films in this embodiment are made such that there is a difference in transmittance of 5% or less when light of the peak wavelength of blue light of about 435 nm and light of the peak wavelength of green light of about 550 nm enter at an angle of incidence of 40° to 45°. In addition, although no red light peak is present in the spectrum shown in FIG. 25, regarding red light, the difference in transmittance due to a change in the angle of incidence of light of about 610 nm is made to be 5% or less. In other words, this polarized light separation film is adjusted so that the difference in transmittance in the important wavelength ranges for red light, green light and blue light, respectively, are 5% or less. The phrase "peaks at various colors" takes the meaning of the range of important wavelengths for each color of light that enters the polarized light separation film.

In this manner, by adjusting the polarized light separation film so that the difference in transmittance due to differences in the angle of incidence of light of wavelengths corresponding to the peaks at various colors is 5% or less, high-intensity light will be transmitted nearly uniformly regardless of the angle of incidence, so color unevenness can be prevented effectively. Therefore, by adopting a polarized light conversion device in a projection display apparatus that projects a color image, a good image with little color unevenness can be obtained.

Note that in the polarization beam splitter shown in FIG. 25, the change in transmittance of incident light with a difference with the angle $\theta_0$ of ±5% or less is controlled to within 5%, but in the event that incident light with a difference with the angle $\theta_0$ greater than ±5 degrees is present, it is sufficient to control the change in transmittance of incident light with a difference with the angle $\theta_0$ greater than ±5 degrees to within 5%. Note that the extent of the difference with the angle $\theta_0$ is different depending on the pitch of the lenses 51-a and 51-b, and the distance from the first lens plate 51 to the polarized light separation films 43 and 47 and the like.

Moreover, in the case of light source light in which the red peak is indistinct as shown in FIG. 25, it is sufficient to control the intensity of red light so that the difference in transmittance is 5% or less within the wavelength range from 600 nm to 750 nm or more preferably, the wavelength range from 600 nm to 620 nm. If on the low-wavelength side of 600 nm, the light would be yellowish and not suitable as illumination light.

Moreover, since the peak near 570 nm in the light spectrum emitted by the light source illustrated in FIG. 25 carries the risk of disrupting the color balance of the illumination light, it would preferably be removed with a filter.

In the fourth preferred embodiment described above, the polarization beam splitter shown in FIG. 17 is used in the polarized light illumination apparatus 500 shown in FIG. 19 and the projection display apparatus 800 shown in FIG. 20, but instead, the polarization beam splitter of the first preferred embodiment shown in FIG. 3 or the polarization beam splitter of the third preferred embodiment shown in FIG. 13, or any of the polarization beam splitters shown in any other preferred embodiment may also be used.

This invention is applicable not only to forward-projection type projection display apparatus wherein the projection surface is projected from the viewing side, but also to rear-projection type display apparatus wherein the projection surface is projected from the side opposite the viewing side. In addition, as the light valves, it is possible to use not only transmission type LCD panels but also reflection type LCD panels also.

In the aforementioned preferred embodiments, the polarized light separation device is fabricated using plate glass, but the material used is not limited to plate glass, as optical glass, plastic or other transparent substrate may also be used.

INDUSTRIAL APPLICABILITY

The polarized light separation device according to this invention is applicable to various types of projection display devices. In addition, the projection display device based on this invention is applicable to the display of images generated by a computer or the like, or images generated by a video recorder by projecting them onto a screen.

What is claims:

1. A method of manufacturing a polarized light separation device that receives a plurality of light fluxes having random directions of polarization and that separates each light flux into two types of polarized light fluxes, the method comprising the steps of:

forming a substrate block having a repetitive structure of a first substrate plate, a polarized light separation layer, a second substrate plate and a reflective layer so that each interval between adjacent of the polarized light separation layers and the reflective layers is of uniform thickness; and cutting the substrate block at a predetermined angle with respect to surfaces of the substrate plates.

2. A method of manufacturing a polarized light separation device according to claim 1, wherein the step of forming a substrate block comprises the steps of:

forming the polarized light separation layers upon the first substrate plates;

forming the reflective layers upon the second substrate plates; and alternately stacking the first substrate plates upon which the polarized light separation layers are formed and the second substrate plates upon which the reflective layers are formed.

3. A method of manufacturing a polarized light separation device according to claim 2, wherein:

in the step of alternately stacking the first substrate plates upon which the polarized light separation layers are formed and the second substrate plates upon which the reflective layers are formed, the first substrate plates and the second substrate plates are stacked alternately with their ends slightly offset by an amount depending on an angle at which the substrate block is to be cut.

4. A method of manufacturing a polarized light separation device according to claim 1, wherein the step of forming a substrate block comprises the steps of:

forming the polarized light separation layers upon the first substrate plates;

forming the reflective layers upon the second substrate plates;

stacking together one of the first substrate plates upon which the polarized light separation layers are formed and one of the second substrate plates upon which the reflective layers are formed, to thereby form a basic block; and stacking together a plurality of the basic blocks.

5. A method of manufacturing a polarized light separation device according to claim 4, wherein:

in the step of stacking together a plurality of the basic blocks, the basic blocks are stacked with their ends slightly offset by an amount depending on an angle at which the substrate block is to be cut.

6. A method of manufacturing a polarized light separation device according to claim 1, further comprising the step of:

polishing a cut surface after the step of cutting the substrate block at a predetermined angle.

7. A method of manufacturing a polarized light separation device according to claim 1, further comprising the step of:

stacking a dummy substrate upon at least one of the substrates making up both surfaces of the substrate block after the substrate block is formed.

8. A method of Manufacturing a polarized light separation device according to claim 1, wherein:

the first substrate plate and the second substrate plate are polished glass plates.

9. A method of manufacturing a polarized light separation device according to claim 8, wherein:

the polished glass plate is white glass plates or non-alkali glass.

10. A method of manufacturing a polarized light separation device according to claim 1, wherein:

the first substrate plate and the second substrate plate are float glass.

11. A method of manufacturing a polarized light separation device according to claim 1, wherein:

one of the first substrate plate and the second substrate plate is formed of a colored light-transparent material and the other is formed of a colorless-light transparent material.

12. A method of manufacturing a polarized light separation device according to claim 1, wherein:

the reflective film is made of a thin aluminum film.

13. A method of manufacturing a polarized light separation device according to claim 1, wherein:

the reflective film is made of a thin aluminum film and a thin dielectric film.

14. A method of manufacturing a polarized light separation device according to claim 1, wherein:

the reflective film is made of a thin dielectric film.

15. A polarized light separation device manufactured by a method of manufacturing a polarized light separation device according to claim 1.

16. A polarized light conversion device using the polarized light separation device according to claim 15, the polarized light conversion device comprising:

polarized light conversion means, provided on a light exit surface side of the polarized light separation device, for converting light having two types of polarized light components separated from the polarized light separation layer into light having one type of polarized light component.

17. A polarized light conversion device according to claim 16, wherein:

the polarized light conversion means is a λ/2 phase layer provided against a light exit surface of the first substrate or a light exit surface of the second substrate.

18. A polarized light conversion device according to claim 16, further comprising:

an anti-reflection film provided on at least one of a light entry surface side and a light exit surface side.

19. A projector comprising:

a light source, an integrator optical system having a first lens plate and second lens plate that divide light from the light source into a plurality of light fluxes;

a polarized light conversion device according to claim 16;

modulation means for modulating light emitted by the polarized light conversion device; and a projection optical system that projects the light modulated by the modulation means.

20. A projector comprising:

a light source;

an integrator optical system having a first lens plate and a second lens plate configured to divide light from the light source into a plurality of light fluxes;

a polarized light conversion device according to claim 16;

a color-separating optical system configured to separate light emitted from the polarized light conversion device into light of a plurality of colors;

modulation means for individually modulating the plurality of colors of light separated by the color-separating optical system;

a synthesizing optical system configured to synthesize the light modulated by the modulation means; and a projection lens configured to project the light synthesized by the synthesizing optical system.

21. A polarized light conversion device according to claim 16, wherein:

transmittance characteristic of the polarized light separation film is adjusted so that differences in transmittance with respect to light of a wavelength corresponding to peaks at various colors are at most about 5% when the light of a wavelength corresponding to the peaks at various colors in the spectrum of the light that enters the polarized light separation film enters at a difference in an angle of incidence within a predetermined range.

22. A polarized light separation device comprising:

a substrate block having a light entry surface, a light exit surface substantially parallel to the light entry surface, and a plurality of light-transparent substrates pasted together sequentially at a plurality of interfaces that form a predetermined angle with respect to the light entry surface and the light exit surface, the substrate block further having a plurality of polarized light separation films and a plurality of reflective films provided alternately on the plurality of interfaces, each interval between adjacent of the polarized light separation films and the reflective films being of uniform thickness; and a position-identifying part provided on at least one side surface of the substrate block formed substantially perpendicularly to at least one of the plurality of interfaces, the position-identifying part being usable at the time of positioning of the polarized light separation device.

23. A polarized light separation device according to claim 22, wherein:

the position-identifying part is located at a position substantially equidistant from side surfaces adjacent to the at least one side surface upon which the position-identifying part is provided.

24. A polarized light separation device according to claim 22, wherein:

the position-identifying part is located at a position which is not equidistant from side surfaces adjacent to the at least one side surface upon which the position-identifying part is provided.

25. A polarized light separation device according to claim 22, wherein the position-identifying part comprises:

a projection.

26. A polarized light separation device according to claim 22, wherein the position-identifying part forms an indentation.

27. A polarized light separation device according to claim 22, wherein:

the position-identifying part is a portion marked with a particular color different than that of the rest of the side surface.

28. A method of manufacturing a polarized light separation device that receives a plurality of light fluxes having random directions of polarization and that separates each light flux into two types of polarized light fluxes, the method comprising the steps of:

(a) alternately pasting together a plurality of light-transparent substrates at a plurality of interfaces to form a compound plate member that has a plurality of polarized light separation films and a plurality of reflective films provided alternately on the plurality of interfaces so that each interval between adjacent of the polarized light separation films and the reflective films is of uniform thickness;

(b) cutting the compound plate member at a predetermined angle with respect to the plurality of interfaces to generate a substrate block that has substantially parallel light entry and light exit surfaces; and (c) polishing the light entry surface and the light exit surface of the substrate block;

wherein the step (a) comprises the step of forming a position-identifying part, that is usable at the time of positioning of the polarized light separation device, on at least one side surface of the substrate block, said side surface being formed substantially perpendicular to at least one of the plurality of interfaces.

29. A method of manufacturing a polarized light separation device according to claim 28, further comprising the step of (d) polishing the light entry surface and the light exit surface of the substrate block.

30. A method of manufacturing a polarized light separation device according to claim 28 or 29, wherein the step (a) includes the step of:

forming a projection as the position-identifying part by offsetting at least one of the plurality of light-transparent substrates from the other light-transparent substrates.

31. A polarized light conversion device comprising:

a polarized light separation device according to claim 22; and polarized light conversion means, provided on a light exit surface side of the polarized light separation device, for converting light having two types of polarized light components separated from the polarized light separation layer into light having one type of polarized light component.

32. A polarized light conversion device according to claim 31, wherein:

the polarized light conversion means is a λ/2 phase layer provided against the light exit surface of every other substrate among the light exit surfaces of the substrates.

33. A polarized light conversion device according to claim 31, further comprising:

an anti-reflection film provided on at least one of the light entry surface side and the light exit surface side.

34. A projector comprising:

a light source;

an integrator optical system having a first lens plate and a second lens plate that divide the light from the light source into a plurality of light fluxes;

a polarized light conversion device according to claim 31;

modulation means for modulating light emitted by the polarized light conversion device; and a projection optical system that projects the light modulated by the modulation means.

35. A projector comprising:

a light source;

an integrator optical system having a first lens plate and a second lens plate that divide the light from the light source into a plurality of light fluxes;

a polarized light conversion device according to claim 31;

a color-separating optical system that separates light emitted from the polarized light conversion device into light of a plurality of colors;

modulation means for individually modulating the plurality of colors of light separated by the color-separating optical system;

a synthesizing optical system that synthesizes the light modulated by the modulation means; and a projection optical system that projects the light synthesized by the synthesizing optical system.

36. A polarized light conversion device comprising:

a plurality of the polarized light separation devices according to claim 15, arranged in series so that the reflective films of each pair of the neighboring polarized light separation devices have reverse orientations; and polarized light conversion means, provided on a light exit surface side of each of the plurality of the polarized light separation devices, for converting light having two types of polarized light components separated by the polarized light separation layers into light having one type of polarized light component.

* * * * *